US009428009B2

(12) United States Patent
Sharratt et al.

(10) Patent No.: US 9,428,009 B2
(45) Date of Patent: Aug. 30, 2016

(54) CONVERTIBLE CASTER ASSEMBLY

(71) Applicant: WAXMAN CONSUMER PRODUCTS GROUP INC., Bedford Heights, OH (US)

(72) Inventors: Jason A. Sharratt, Wadsworth, OH (US); Jacob Meyers, Fairview Park, OH (US); Andrew Logar, Willowick, OH (US)

(73) Assignee: Waxman Consumer Products Group Inc., Bedford Heights, OH (US)

(*) Notice: Subject to any disclaimer, the term of this patent is extended or adjusted under 35 U.S.C. 154(b) by 0 days.

(21) Appl. No.: 14/698,623

(22) Filed: Apr. 28, 2015

(65) Prior Publication Data
US 2015/0306908 A1 Oct. 29, 2015

Related U.S. Application Data

(60) Provisional application No. 61/985,665, filed on Apr. 29, 2014, provisional application No. 62/005,198, filed on May 30, 2014.

(51) Int. Cl.
*B60B 33/00* (2006.01)
*B60B 33/02* (2006.01)

(52) U.S. Cl.
CPC ......... *B60B 33/0028* (2013.01); *B60B 33/025* (2013.01); *B60B 33/0049* (2013.01); *B60B 33/0068* (2013.01)

(58) Field of Classification Search
CPC . Y10T 16/195; Y10T 16/196; Y10T 16/216; Y10T 16/203; Y10T 16/204; Y10T 16/218; Y10T 16/193; Y10T 16/1937; Y10T 16/1943; B60B 33/0078; B60B 33/0086; B60B 33/02; B60B 33/021; B60B 33/023; B60B 33/025; B60B 33/0042; B60B 33/0065; B60B 33/0068; B60B 33/0073; B60B 33/0076; B60B 33/0028; B60B 33/04; B60B 2301/046; B60B 2301/0463; B60B 2301/0465; B60B 2301/0467; A61G 2007/0528
See application file for complete search history.

(56) References Cited

U.S. PATENT DOCUMENTS 1,839,396 A * 1/1932 Kimball ................. B60B 33/04
16/102

(Continued)

FOREIGN PATENT DOCUMENTS

JP 58149801 A * 9/1983
JP 61178202 A * 8/1986

(Continued)

OTHER PUBLICATIONS

Catalog entitled "Colson® Caster Corporation Catalog—2012", Copyright 2012, Published by Colson Caster Corporation, Jonesboro, AR (134 pages).

(Continued)

*Primary Examiner* — Chuck Mah
(74) *Attorney, Agent, or Firm* — Tarolli, Sundheim, Covell & Tummino LLP

(57) ABSTRACT

A caster assembly including a plate assembly configured to support an object to be moved; and a yoke assembly rotatably connected to the plate assembly including a caster wheel for rolling engagement with a surface. The plate assembly includes an upper plate and a lower plate coupled by a connector defining a swivel axis. The plate assembly includes a notched ring concentric about the swivel axis of rotation, the notched ring including a plurality of circumferentially spaced apart detent notches. The yoke assembly includes a yoke and a pair of spaced apart legs extending from the yoke supporting the caster wheel, the yoke disposed between the top and bottom plates and rotatable about the swivel axis. A lock assembly mounted to the yoke includes a bolt movable between an unlocked swivel position and a locked position in which the bolt engages a selected one of the plurality of detent notches.

20 Claims, 32 Drawing Sheets

(56) References Cited

U.S. PATENT DOCUMENTS

| | | | | |
|---|---|---|---|---|
| 2,345,442 A * | 3/1944 | Winter | | B60B 33/021 16/35 R |
| 2,468,399 A * | 4/1949 | Grossman | | B60B 33/00 16/18 R |
| 2,500,854 A * | 3/1950 | Mullen | | B60B 33/00 16/21 |
| 2,544,924 A * | 3/1951 | Herold | | B60B 33/0028 104/306 |
| 2,834,608 A * | 5/1958 | Wixson | | B60G 7/04 16/19 |
| 3,537,721 A * | 11/1970 | Warner, Jr. | | A45C 5/14 16/18 R |
| 4,008,507 A * | 2/1977 | Smith | | B60B 33/06 16/34 |
| 4,028,773 A * | 6/1977 | Morgan | | B60B 33/02 16/35 D |
| 4,035,864 A * | 7/1977 | Schroder | | B60B 33/021 16/35 R |
| 4,336,629 A * | 6/1982 | Jarvis, Jr. | | B60B 33/0078 16/35 R |
| 4,349,937 A * | 9/1982 | Fontana | | B60B 33/0078 16/35 R |
| 4,349,938 A * | 9/1982 | Fontana | | B60B 33/0078 16/35 R |
| 4,471,508 A * | 9/1984 | Seaborg | | B60B 33/04 16/18 R |
| 4,669,146 A * | 6/1987 | Saito | | B60B 33/0002 16/18 A |
| 4,835,815 A * | 6/1989 | Mellwig | | B60B 33/0078 16/35 R |
| 5,012,550 A * | 5/1991 | Schlosser | | B60B 33/0078 16/35 R |
| 5,461,753 A * | 10/1995 | Rounds | | F16C 19/10 16/21 |
| 5,943,734 A * | 8/1999 | Pearce | | A61G 5/00 16/18 R |
| 6,550,100 B2 | 4/2003 | Drucker et al. | | |
| 6,810,560 B1 * | 11/2004 | Tsai | | B60B 33/0021 16/20 |
| 8,167,095 B2 * | 5/2012 | Sonnendorfer | | B60B 33/0021 16/35 R |
| 8,172,240 B2 * | 5/2012 | Zimmerman | | B62B 5/0083 280/43.1 |
| 8,424,158 B2 * | 4/2013 | Steenson | | B60B 33/0018 16/35 R |
| D735,021 S * | 7/2015 | Da Cunha | | D8/375 |
| 2006/0254867 A1 * | 11/2006 | Yan | | B60B 33/0021 188/73.1 |
| 2006/0267295 A1 * | 11/2006 | You | | B60B 19/00 280/5.28 |
| 2011/0131761 A1 * | 6/2011 | Campbell | | B60B 33/045 16/35 D |
| 2015/0174977 A1 * | 6/2015 | Shahroodi | | B60D 1/665 280/476.1 |

FOREIGN PATENT DOCUMENTS

JP 2009113782 A * 5/2009
KR WO 2010140764 A1 * 12/2010 ......... B60B 33/0018

OTHER PUBLICATIONS 6 photographs of a caster (model No. 2.04156.95) manufactured by Colson Caster Corporation, Jonesboro, AR. (6 pages) the caster depicted in the 6 photographs is prior art to the present application.

* cited by examiner

CONVERTIBLE CASTER ASSEMBLY

CROSS REFERENCE TO RELATED APPLICATIONS

The following application claims priority under 35 U.S.C. §119(e) to U.S. Provisional Patent Application Ser. No. 62/005,198 filed May 30, 2014 entitled CONVERTIBLE CASTER ASSEMBLY, and U.S. Provisional Patent Application Ser. No. 61/985,665 filed Apr. 29, 2014 entitled CONVERTIBLE CASTER ASSEMBLY. The above-identified applications are incorporated herein by reference in their respective entireties for all purposes.

TECHNICAL FIELD

This disclosure relates to a caster assembly that is readily convertible or changeable between a swivel configuration and a non-swiveling or rigid configuration, the caster assembly including a stationary plate assembly and a rotatable yoke assembly, the yoke assembly including a spring lock mechanism including a retractable bolt, the plate assembly including a ring including a plurality of circumferentially spaced apart detent notches configured to receive the bolt of the spring assembly to releasably affix the yoke assembly to the plate assembly in a rigid configuration.

BACKGROUND

Casters are widely used for to provide rolling support for a variety of objects including carts, moving dollies, convertible hand trucks, tool chests, hydraulic floor jacks, appliances, chairs, stools, bed frames, and the like. Typically, a plurality of casters are used to support an object, typically positioned at corner positions of a bottom surface of the object or, if the object has downwardly extending legs, affixed to the bottom surfaces of each leg. For some objects, like an appliance, a plurality of casters may be affixed directly to a bottom of the appliance frame and the appliance represents the load supported by the casters, i.e., the casters affixed to the bottom of a washing machine frame support the weight of the washing machine and allow for rolling movement of the washing machine along a basement floor. For other objects, like a moving dolly, the casters are affixed to a support platform. The support platform of the moving dolly or a plurality of moving dollies, in turn, are used to support and move a heavy object, such as a piano or desk.

A caster typically includes a hard plastic or rubber or pneumatic wheel mounted on a horizontally-oriented wheel axle allowing the caster wheel to roll about a horizontal axis of rotation (horizontal rotational axis) across a surface, such as a floor. Casters are typically sold in two configurations—swiveling and fixed. In a swiveling configuration, the caster wheel is free to swivel about a vertical rotational axis or swivel axis defined by a rotational connection between a stationary plate assembly and a rotatable yoke assembly to which the caster wheel is mounted. The plate assembly is typically affixed to an object, such as a support platform (moving dolly), a bottom of an appliance frame or a leg of a chair or stool. In the swiveling configuration, the caster yoke assembly is able to swivel about the swivel axis with respect to the plate assembly and the caster wheel is able to rotate about the horizontal rotational axis so that the caster can simultaneously swivel and roll so that the caster wheel may move in any desired direction along a floor.

In the rigid configuration, the caster wheel is fixed in a given rotational orientation with respect to the plate assembly. Thus, the caster wheel is constrained to move or roll about the horizontal rotational axis in a single linear direction, i.e., forward or backward, only.

Depending on the nature of the load to be moved and the desired path travel for moving the load; it may be desirable to have a caster that is convertible between use in a swiveling configuration and use in a rigid configuration.

SUMMARY

In one aspect, the present disclosure concerns a caster assembly including: a plate assembly configured to support an object to be moved; a yoke assembly rotatably connected to the plate assembly including a caster wheel for rolling engagement with a surface; the plate assembly including an upper plate and a lower plate coupled by a connector, a longitudinal extent of the connector defining a swivel axis of rotation of the yoke assembly with respect to the plate assembly, the plate assembly including a notched ring concentric about the swivel axis of rotation, the notched ring including a plurality of circumferentially spaced apart detent notches; the yoke assembly including a yoke and a pair of spaced apart legs extending from the yoke, the yoke interposed between the top and bottom plates and rotatable about the connector with respect to the swivel axis of rotation, the pair of legs supporting the caster wheel for rotation about a wheel axis of rotation transverse to the swivel axis of rotation; and a lock assembly mounted to the yoke including a bolt movable between a first unlocked position and a second locked position, in the second locked position of the bolt, the bolt engaging a selected one of the plurality of detent notches of the ring of the plate assembly inhibiting relative rotation of the yoke assembly with respect to the plate assembly about the swivel axis of rotation and in the first unlocked position of the bolt, the bolt spaced from the plurality of detent notches of the plate assembly permitting relative rotation of the yoke assembly with respect to the plate assembly about the swivel axis of rotation.

In another aspect, the present disclosure concerns a caster assembly including: a plate assembly configured to support an object to be moved; and a yoke assembly rotatably connected to the plate assembly including a caster wheel for rolling engagement with a surface; the plate assembly including an upper plate and a lower plate coupled by a connector, a longitudinal extent of the connector defining a swivel axis of rotation of the yoke assembly with respect to the plate assembly; the yoke assembly including a yoke and a pair of spaced apart legs extending from the yoke, the yoke disposed between the top and bottom plates and rotatable about the connector with respect to the swivel axis of rotation, the pair of legs supporting the caster wheel for rotation about a wheel axis of rotation transverse to the swivel axis of rotation, the caster wheel of the yoke assembly including a wheel axle extending though a central opening of the wheel, the wheel axle defining the wheel axis of rotation, the pair of legs of the yoke assembly include horizontally aligned slots to receive the wheel axle, the aligned slots define first horizontally aligned openings at first end portions of the horizontally aligned slots and second horizontally aligned openings at second end portions of the horizontally aligned slots, the first horizontally aligned openings end portion being positioned on the pair of legs of the yoke assembly such that the wheel axis of rotation is perpendicular to and intersects the swivel axis of rotation when the wheel axle is secured in the first horizontally aligned openings and the second horizontally aligned openings being positioned on the pair of legs of the yoke assembly such that the wheel axis of rotation is perpendicular to and is spaced from the swivel axis of rotation; and a lock assembly mounted to the yoke including a bolt movable between a first unlocked position and a second locked position, in the second locked position of the bolt, the bolt inhibiting relative rotation of the yoke assembly with respect to the plate assembly about the swivel axis of rotation and in the first unlocked position of the bolt, the bolt permitting relative rotation of the yoke assembly with respect to the plate assembly about the swivel axis of rotation.

In another aspect, the present disclosure concerns a caster assembly including: a plate assembly; a yoke assembly rotatably connected to the plate assembly including a caster wheel for rolling engagement with a surface; the plate assembly including an upper plate and a lower plate coupled by a connector, a central axis of the connector defining a swivel axis of rotation of the yoke assembly with respect to the plate assembly; the yoke assembly including a yoke and a pair of spaced apart legs extending from the yoke, the yoke disposed between the top and bottom plates and rotatable about the connector with respect to the swivel axis of rotation, the pair of legs supporting the caster wheel for rotation about a wheel axis of rotation transverse to the swivel axis of rotation, the caster wheel of the yoke assembly including a wheel axle extending though a central opening of the wheel, the wheel axle defining the wheel axis of rotation, the pair of legs of the yoke assembly include first horizontally aligned openings and second horizontally aligned openings, the first horizontally aligned openings end portion being positioned on the pair of legs of the yoke assembly, the wheel axle being selectively movable between the first horizontally aligned openings and the second horizontally aligned openings, such that when the wheel axle is positioned in the first horizontally aligned openings, the wheel axis of rotation is perpendicular to and intersects the swivel axis of rotation and when the wheel axle is positioned in the second horizontally aligned openings, the wheel axis of rotation is perpendicular to and is spaced from the swivel axis of rotation; and a lock assembly mounted to the yoke including a bolt movable between a first unlocked position and a second locked position, in the second locked position of the bolt, the bolt inhibiting relative rotation of the yoke assembly with respect to the plate assembly about the swivel axis of rotation and in the first unlocked position of the bolt, the bolt permitting relative rotation of the yoke assembly with respect to the plate assembly about the swivel axis of rotation.

BRIEF DESCRIPTION OF THE DRAWINGS

The foregoing and other features and advantages of the present disclosure will become apparent to one skilled in the art to which the present invention relates upon consideration of the following description of the invention with reference to the accompanying drawings, wherein like reference numerals refer to like parts unless described otherwise throughout the drawings and in which.

DETAILED DESCRIPTION

Figure 1:
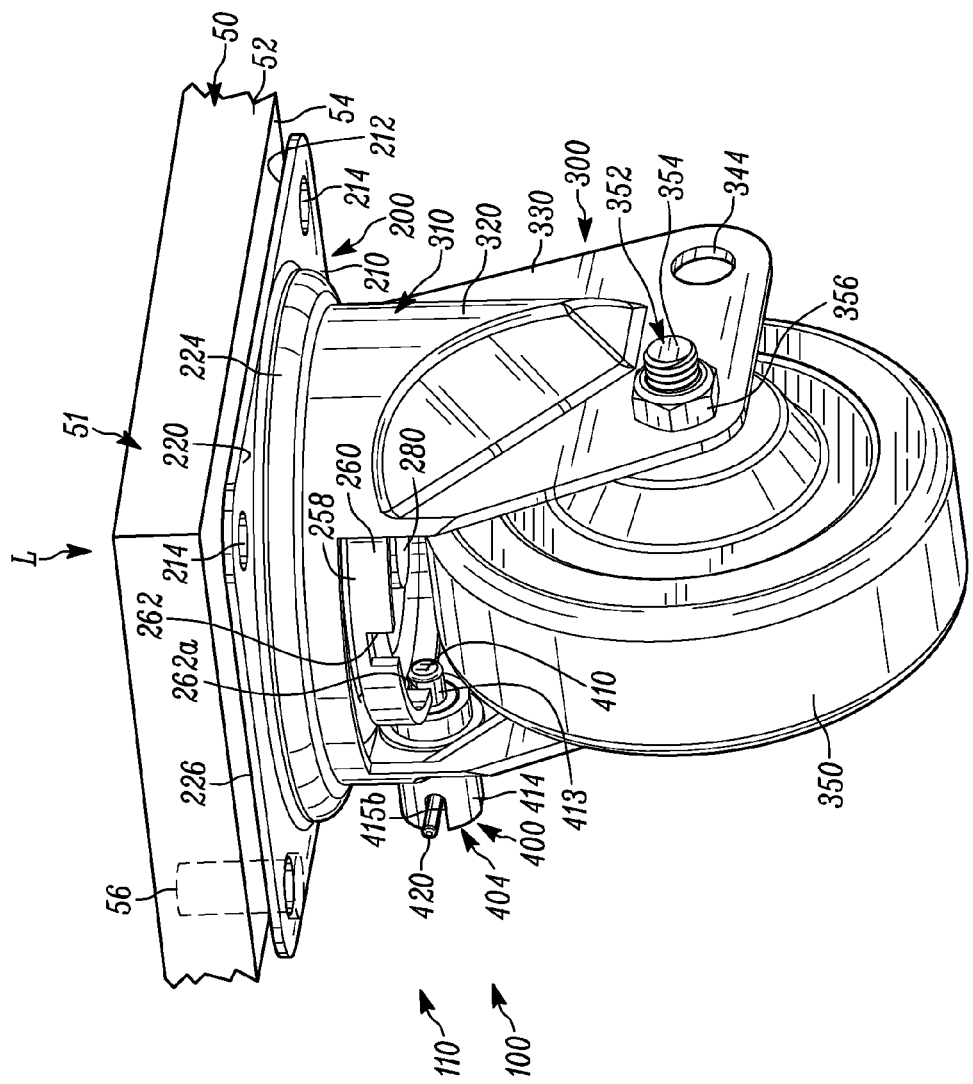
FIG. 1 is a schematic front, right side perspective view of an exemplary embodiment of a convertible caster assembly of the present disclosure, in a non-swiveling or rigid configuration wherein a yoke assembly of the caster assembly does not swivel with respect to a support or plate assembly of the caster assembly.
Figure 2:
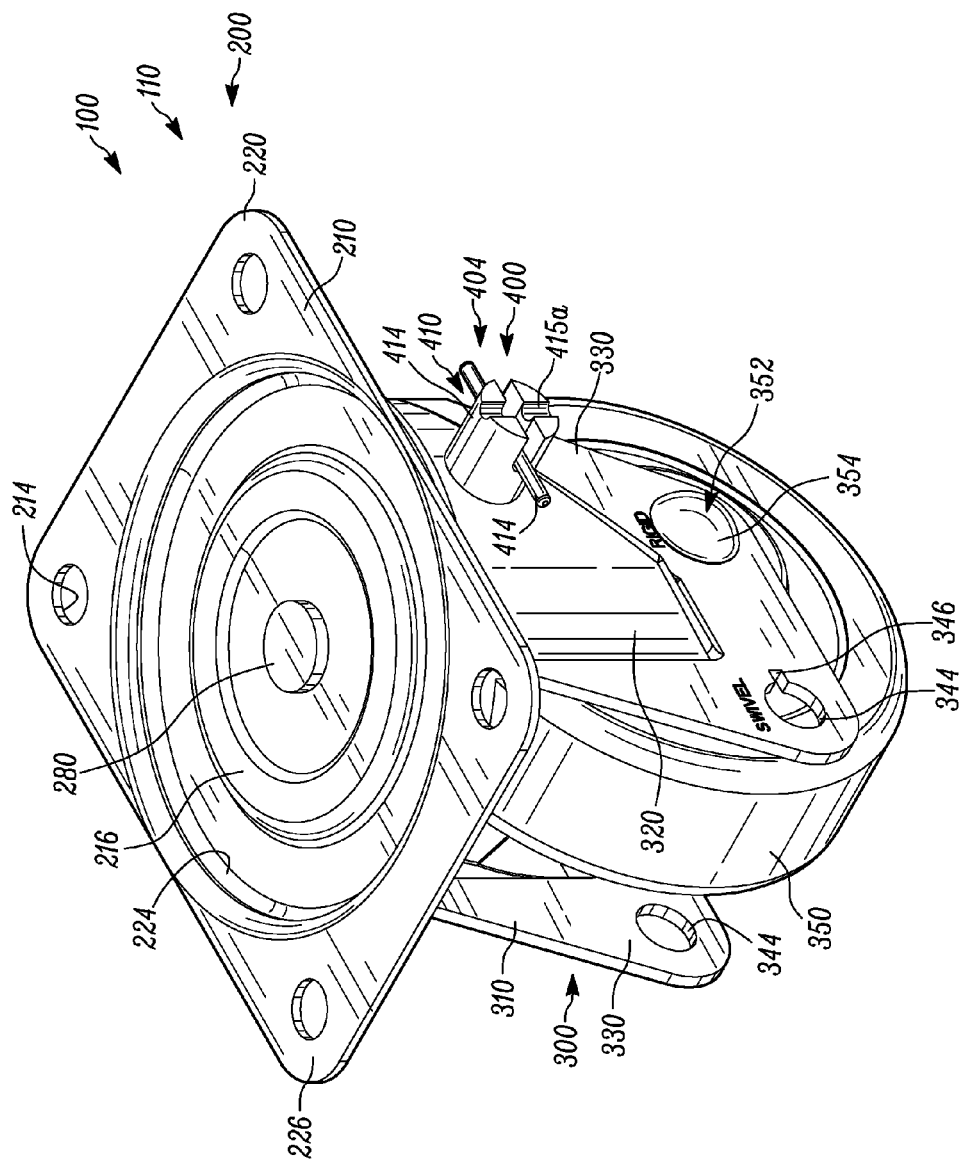
FIG. 2 is a schematic rear, left side perspective view of the convertible caster assembly of FIG. 1.
Figure 3:
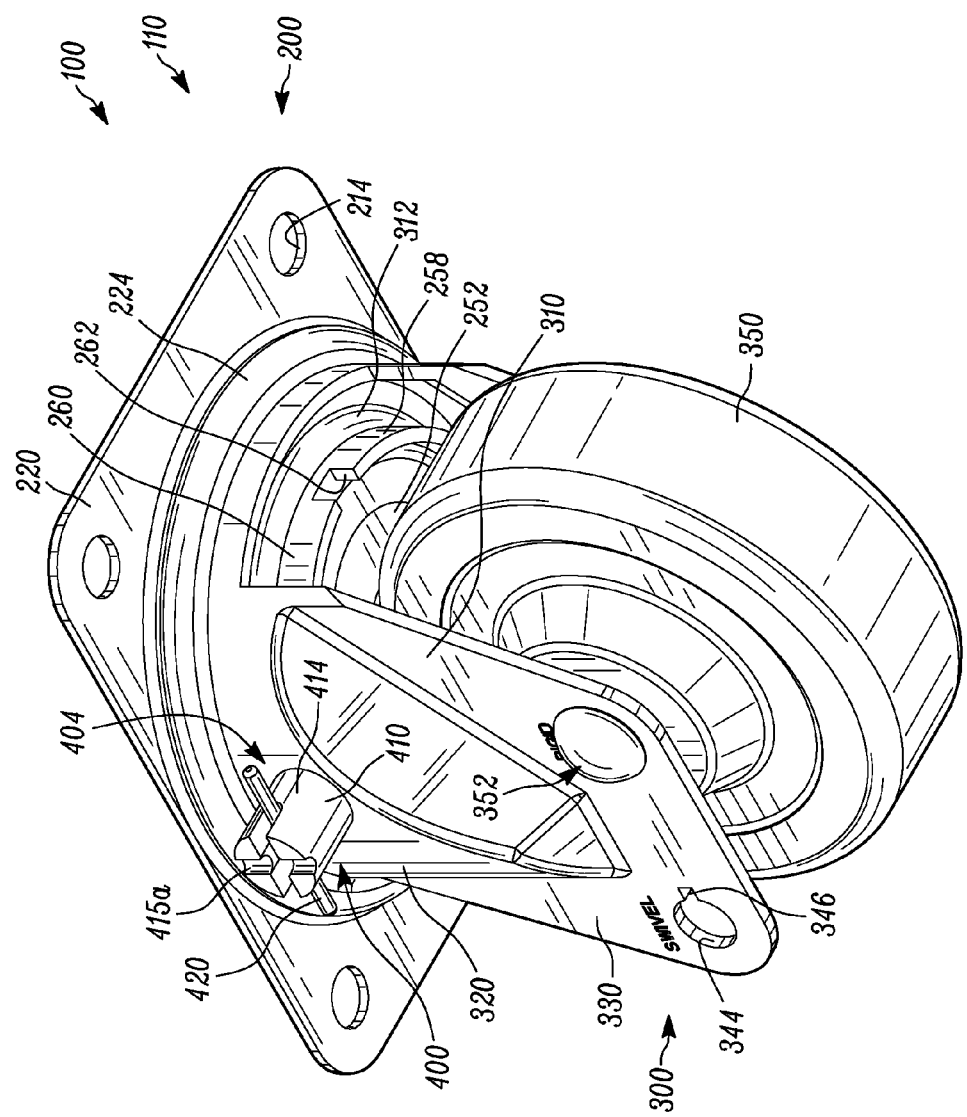
FIG. 3 is a schematic bottom, left side perspective view of the convertible caster assembly of FIG. 1.
Figure 4:
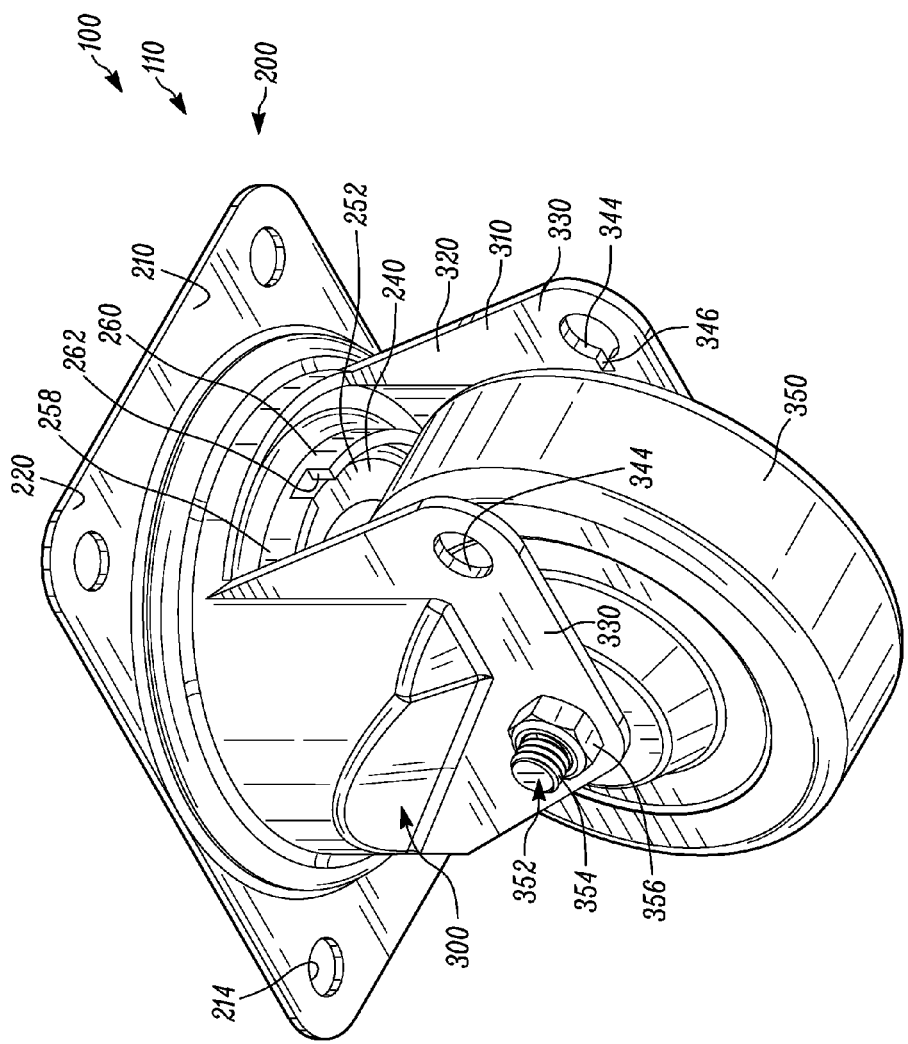
FIG. 4 is a schematic bottom, right side perspective view of the convertible caster assembly of FIG. 1.

Referring now to the Figures generally wherein like numbered features shown therein refer to like elements throughout unless otherwise noted. The present disclosure relates to a caster assembly and, more specifically, to a caster assembly that is changeable or convertible between a swivel configuration where a yoke assembly of the caster assembly swivels or freely rotates about a vertical swivel axis of rotation with respect to a support or plate assembly and a rigid configuration where the yoke assembly is inhibited from swiveling about the swivel axis of rotation by a locking pin arrangement.

Turning to the drawings, one exemplary embodiment of the convertible caster assembly of the present disclosure is schematically shown at 100, in FIGS. 1-22. FIGS. 1-11 schematically show the caster assembly 100 in a non-swiveling or rigid configuration 110, while FIGS. 12-22 schematically show the caster assembly in a swiveling configuration 120. The caster assembly 100 of the present disclosure may be advantageously used to support a wide variety of objects and loads. For example, the caster assembly 100 may be mounted to an object 50 used to move a load L (FIG. 1) along a surface 40, such as a floor (FIG. 7). The caster assembly 100 may be part of an object, such as, for example, a moving dolly 50. The caster assembly 100 is positioned under and affixed to a corner region 51 of a flat support member 52, such as a board, of the moving dolly 50. The caster assembly 100 supports one corner of the board 50 for rolling engagement along the floor 40, while other similar caster assemblies are suitably positioned under and affixed to the other three corner regions of the board 50 and/or other regions of the board 50. The moving dolly 50 is then used to support and move the load L, such as a large piece of furniture, along the floor 40, both the furniture and the board 40 contributing to the load L applied to the caster assembly 100.

A support or plate assembly 200 of the caster assembly 100 includes an upper plate 210 having a generally planar upper surface 212 and a plurality of apertures 214 for mounting the caster assembly 100 to the bottom surface 54 of the dolly board 50. A fastener 56, such as a threaded screw (one of which is shown in FIG. 1), passes Page 8 of 19 through the aperture 214 and threads into the board 50 to secure the caster assembly 100 to the underside 54 of the support board 52 of the dolly 50.

Alternatively, the caster assembly 100 of the present disclosure may be mounted to an object having vertical projections or legs for rolling engagement along the floor 40. For example, the caster assembly 100 may be mounted to a bottom surface of a leg of a chair or a stool. In such an embodiment, the upper plate 210, instead of or in addition to defining a planar mounting surface, may include a vertically oriented fastener, such as a vertical screw or bolt or flange, to permit the caster assembly 100 to be affixed to the vertical chair or stool leg. It is within the contemplation of the present disclosure to have a variety of mounting configurations defined by the upper plate 210, depending on the nature of the object 50 to be supported and the load L to be carried by the caster assembly 100.

Figure 5:
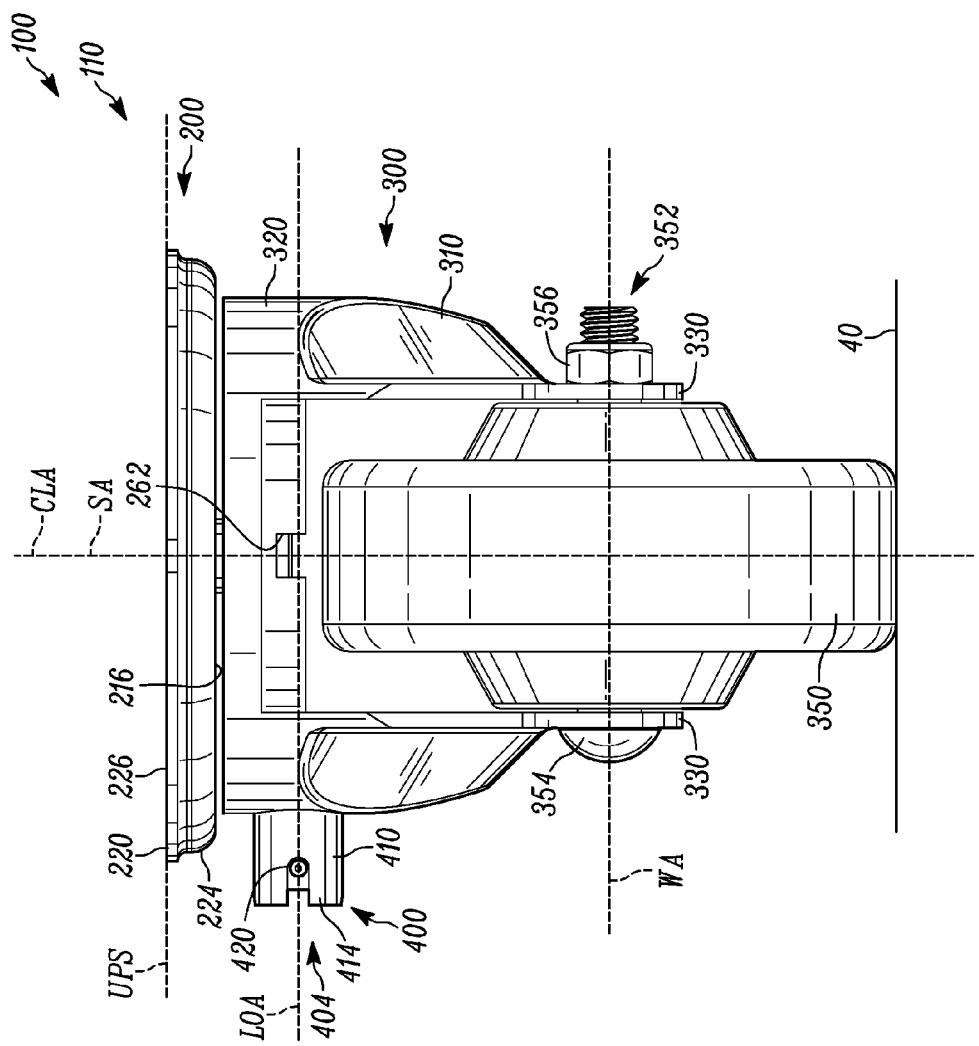
FIG. 5 is a schematic front elevation view of the convertible caster assembly of FIG. 1.
Figure 6:
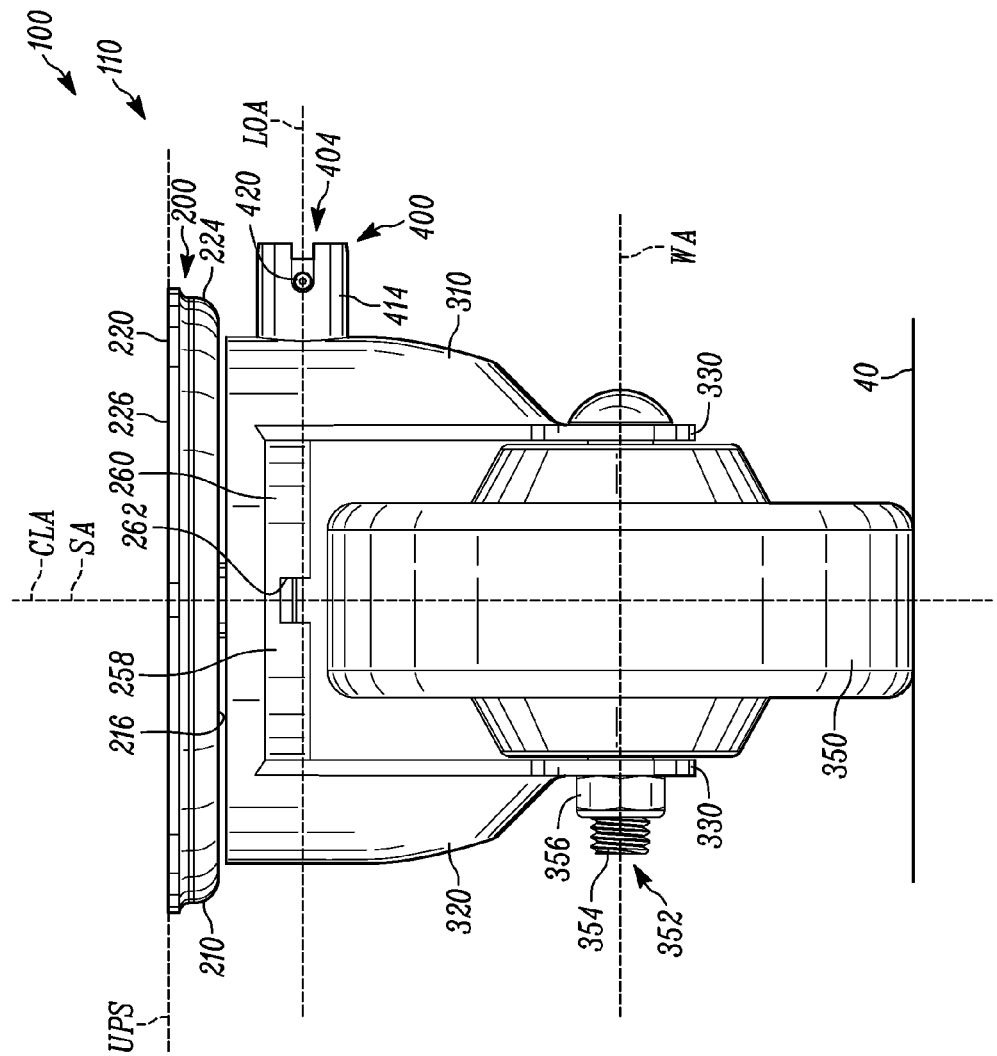
FIG. 6 is a schematic rear elevation view of the convertible caster assembly of FIG. 1.
Figure 7:
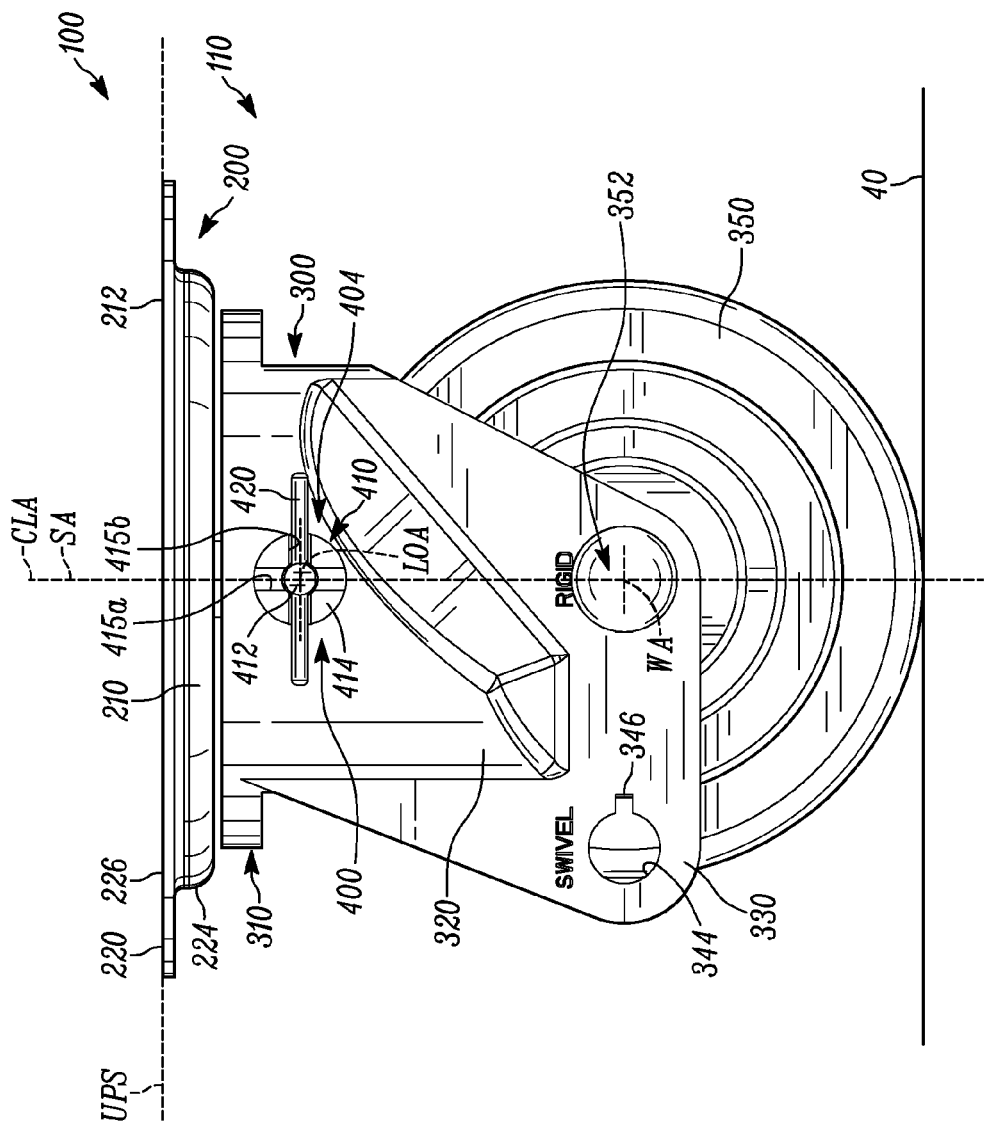
FIG. 7 is a schematic left side elevation view of the convertible caster assembly of FIG. 1.
Figure 8:
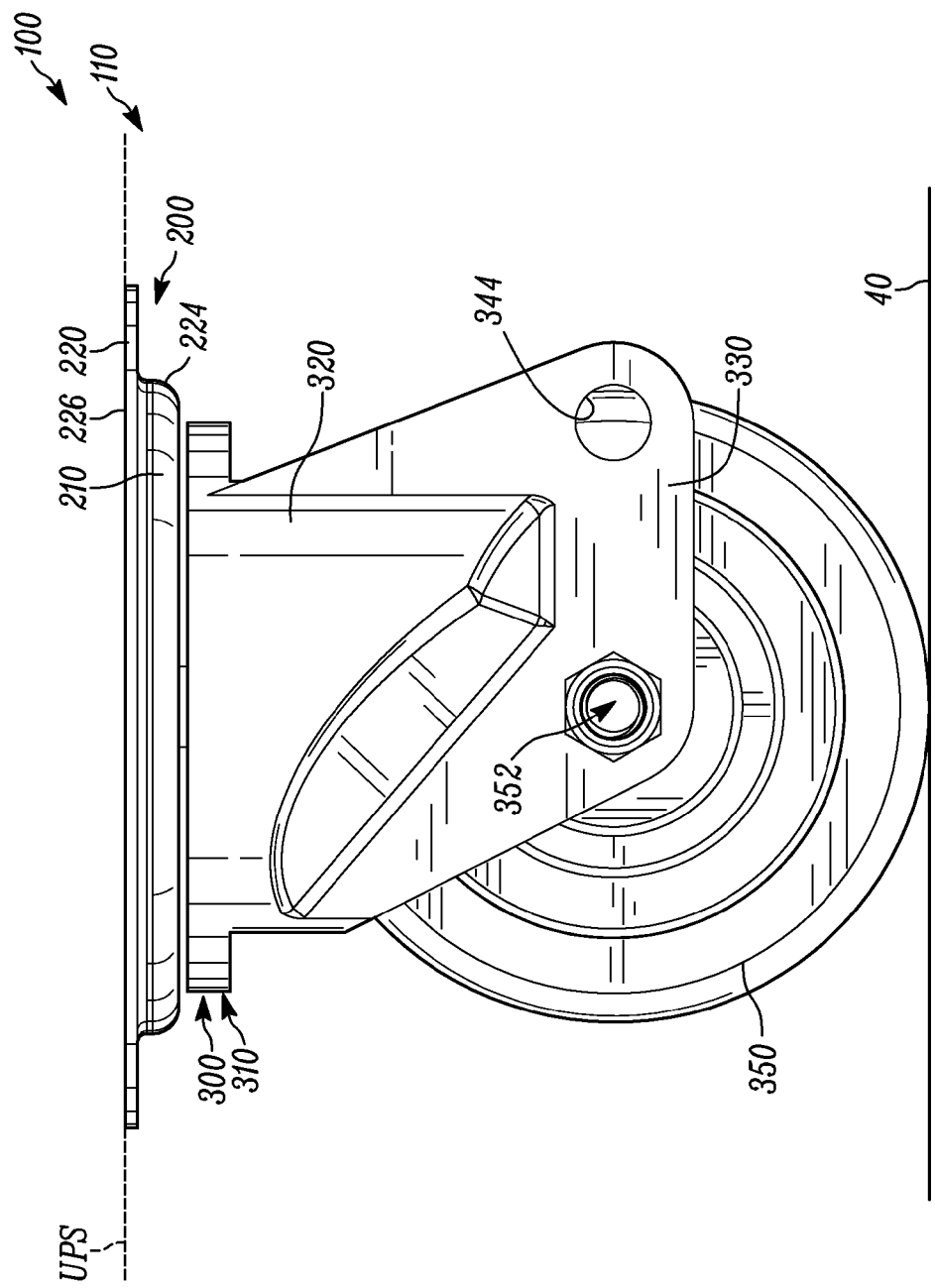
FIG. 8 is a schematic right side elevation view of the convertible caster assembly of FIG. 1.
Figure 9:
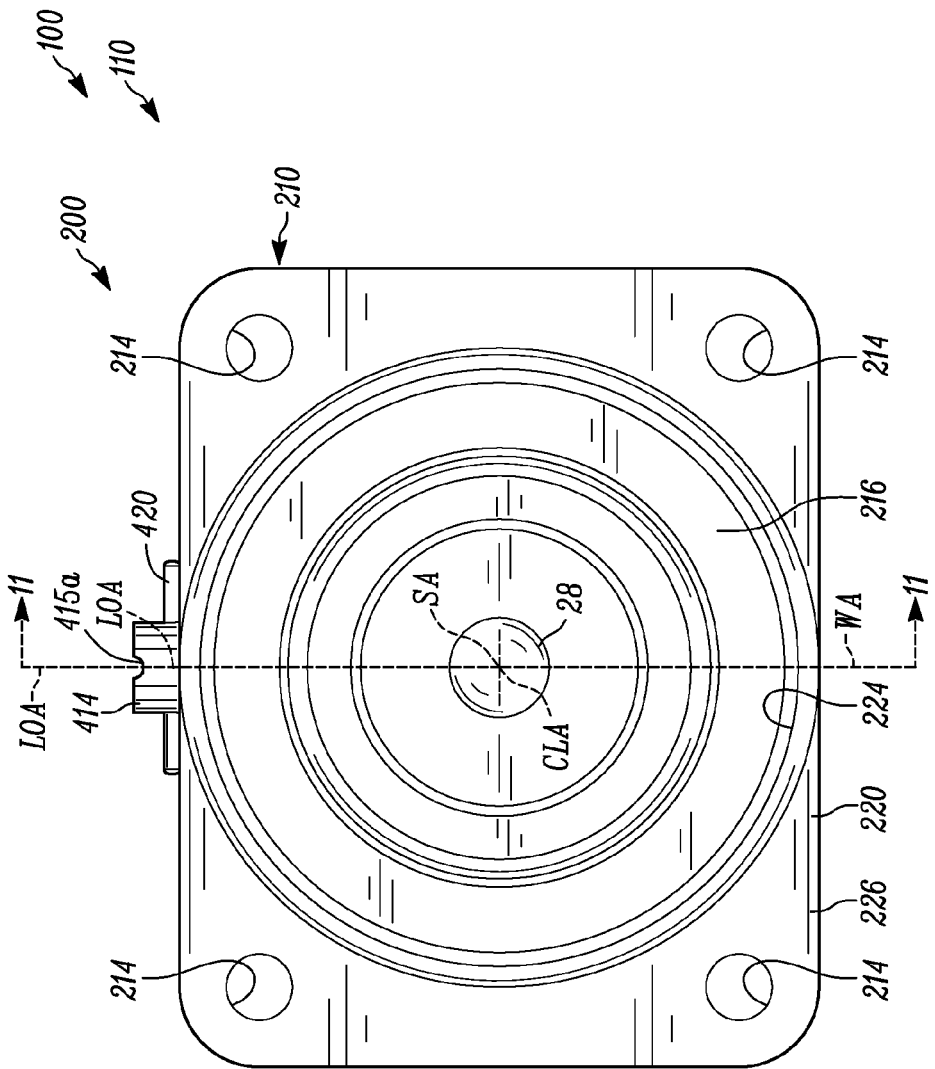
FIG. 9 is a schematic top plan view of the convertible caster assembly of FIG. 1.
Figure 10:
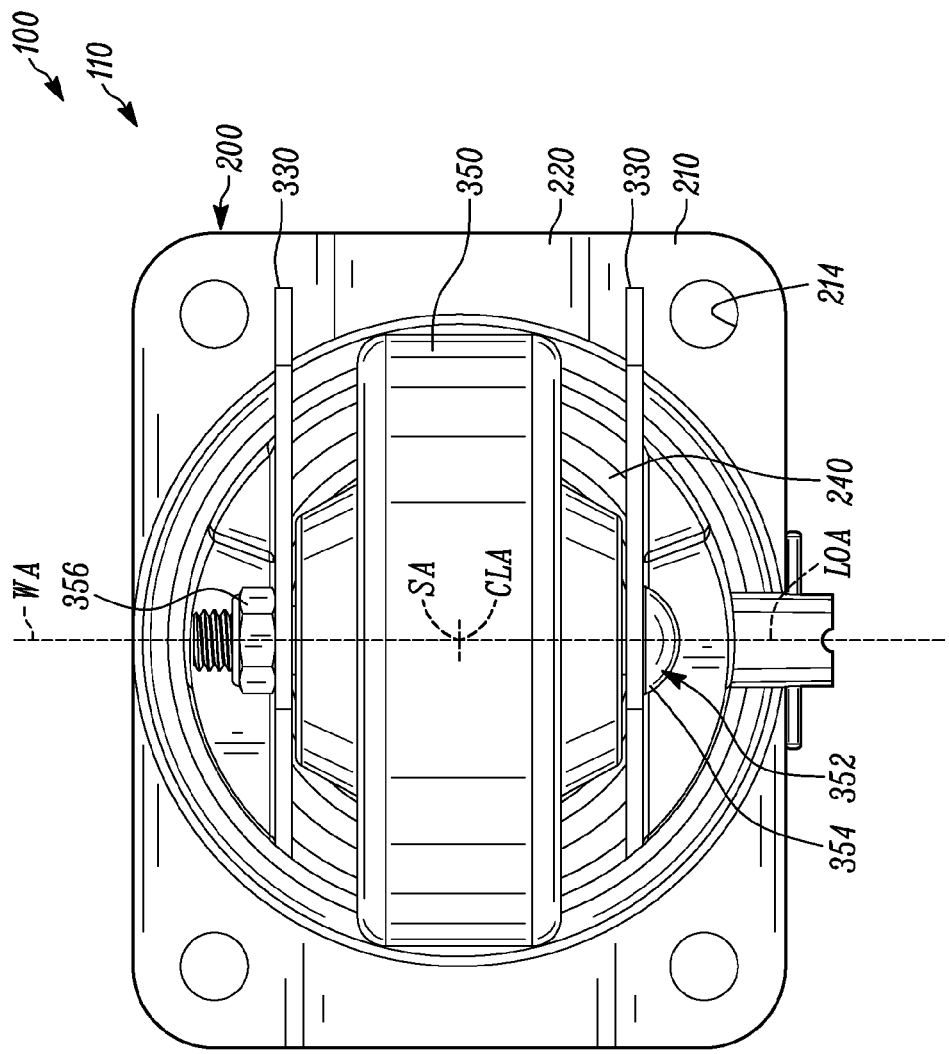
FIG. 10 is a schematic bottom plan view of the convertible caster assembly of FIG. 1.

The caster assembly 100 includes the support or plate assembly 200, designed to be attached to the object 50 to be supported and a yoke assembly 300 rotatably coupled to plate assembly 200 and rotating or swiveling with respect to the plate assembly 200 about a substantially vertical swivel axis of rotation SA (FIGS. 5, 6 and 7). The yoke assembly 300 includes a caster wheel 350 which engages the floor surface 40 and rolls about a substantially horizontal wheel axis of rotation WA (FIGS. 5 and 6) to allow the caster assembly 100 to roll along the floor 40, thereby moving the object 50 and the load L support by the caster assembly 100 along the floor surface 40.

The caster assembly 100 also includes a lock mechanism or assembly 400 which releasably locks the yoke assembly 300 to the plate assembly 200. Specifically, the lock assembly 400 includes a spring lock 410 and a notched ring 260. The spring lock 410 includes a bolt 412 movable along a line of action LOA (FIGS. 5 and 6) between a first, unlocked position 402 (shown in FIGS. 12-22), in which the yoke assembly 300 is free to swivel about the swivel axis SA with respect to the plate assembly 200, and a second, locked position 404 (shown in FIGS. 1.11), in which the yoke assembly 300 is affixed to the plate assembly 200 thereby precluding swiveling or rotational movement of the yoke assembly 300 with respect to the plate assembly 200. Movement of the bolt 412 between the two positions 402, 404 along the line of action LOA selectively changes or converts the caster assembly 100 between the non-swivel or rigid configuration 110 (as shown in FIGS. 1-11) and the swivel configuration 120 (as shown in FIGS. 12-22).

Figure 11:
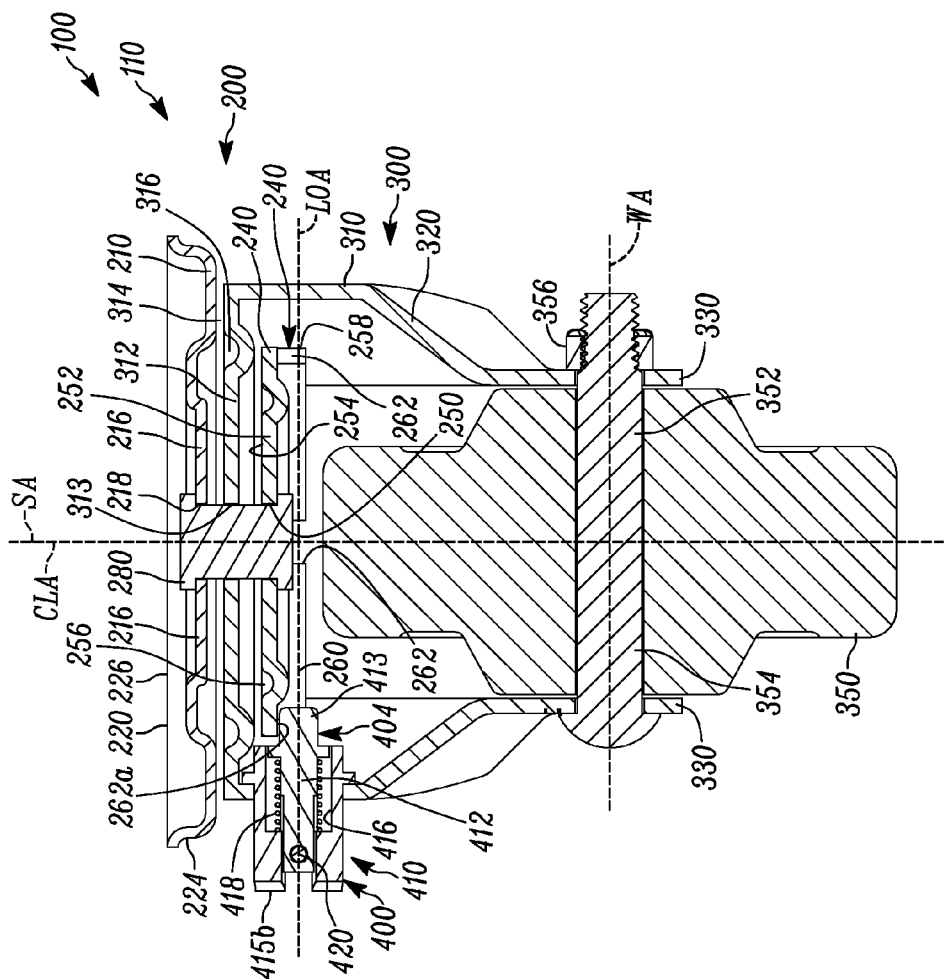
FIG. 11 is a schematic section view of the of the convertible caster of FIG. 1 as seen from a plane indicated by the line 11-11 in FIG. 9.
Figure 22:
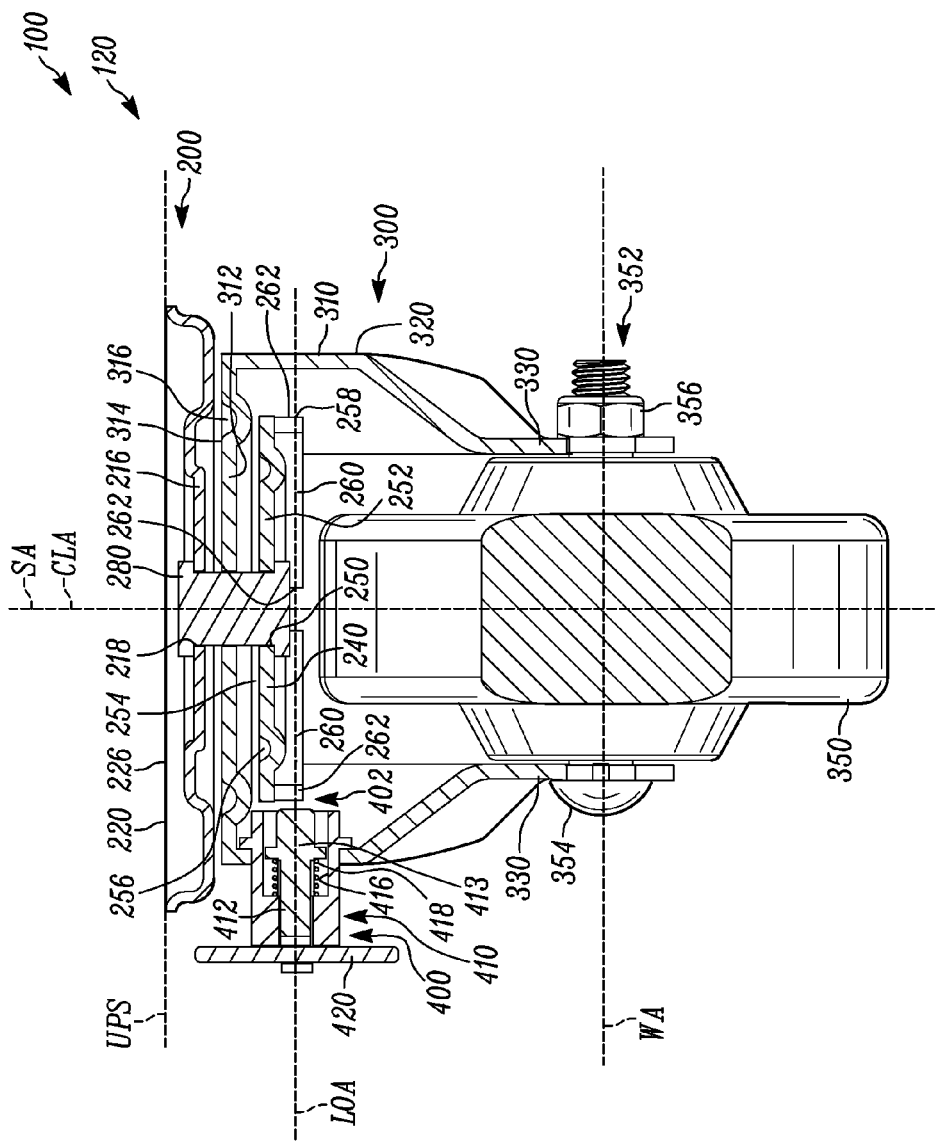
FIG. 22 is a schematic section view of the of the convertible caster of FIG. 12 as seen from a plane indicated by the line 22-22 in FIG. 20.

As can best be seen in FIGS. 11 and 22, the spring lock 410 is mounted to the yoke assembly 300 and includes the bolt 412 mounted in a throughbore 416 of a tubular sleeve 414. A biasing spring 418 is interposed in the throughbore 416 between the bolt 412 and the sleeve 414 to bias the bolt in a radially inward direction. The line of action LOA of the bolt 412, that is, a central axis of the bolt and the path along which the bolt 412 moves, is substantially orthogonal to and insects the swivel axis SA of the convertible caster assembly 100.

When the bolt 412 of the spring lock 410 is in the first, unlocked position 402 (best seen in FIG. 12), the yoke assembly 300 and the caster assembly 100 are in the swivel configuration 120. When the bolt 412 of the spring lock 410 is in the second, locked position 404 (best seen in FIGS. 1 and 2), the yoke assembly 300 and the caster assembly 100 are in the rigid configuration 110.

The lock assembly 400 further includes the notched ring 260 which extends axially downwardly from a lower plate 240 of the plate assembly 200 and which includes a plurality of detent notches 262. In the second, locked position 404 of the spring lock assembly 400, the bolt 412 extends into a selected notch 262*a* (FIG. 1) of the plurality of detent notches 262 to releasably lock the yoke assembly 300 to the plate assembly 200 thereby inhibiting relative rotation of the yoke assembly 300 about the swivel axis of rotation SA. In one exemplary embodiment the number of detent notches 262 is four and they are spaced 90 degrees apart circumferentially. In the first, unlocked position 402 of the spring lock assembly, the bolt 412 is spaced from the notched ring 260 and the plurality of detent notches 262 such that the yoke assembly 220 is free to rotate with respect to the plate assembly 200 about the swivel axis of rotation SA.

Plate Assembly 200

The plate assembly 200 includes the upper plate 210, the lower plate 240 and a central connector or kingpin 280. The connector 280 extends through aligned central openings 218, 250 of the upper and lower plates 210, 240 and fixes or pins the upper and lower plates 210, 240 together such that the plates 210, 240 are stationary with respect to each other. A longitudinal axis through the vertically oriented connector 280 defines a central longitudinal axis CLA of the connector 280 and the convertible caster assembly 100. The central longitudinal axis CLA of the caster assembly 100 is parallel to and coincident with the swivel axis of rotation SA. Stated another way, a longitudinal extent of the connector 280 defines the swivel axis of rotation SA of the yoke assembly 300 with respect to the plate assembly 200.

The upper plate 210 of the plate assembly 200 includes a central region 216 and an axially offset outer peripheral region 220. The central region 216 defines the opening 218 through which the connector 280, affixing the upper and lower plates 210, 240, passes. An upturned transition region 224 extends radially outwardly and axially upwardly from the central region 216 to the outer peripheral region 220. The outer peripheral region 220 defines a planar upper surface UPS providing a mounting surface for the board 52 of the moving dolly 50. The planar upper surface UPS is shown schematically in FIGS. 5-8. As can best be seen in FIGS. 5-8, the upper planar surface UPS defined by the upper plate 610 is parallel to the horizontal wheel axis of rotation WA of the caster wheel 350 and orthogonal to a swivel axis of rotation SA of the yoke assembly 300. In one exemplary embodiment, the outer peripheral region 220 includes four apertures 214 to receive fasteners 56 affixing the caster assembly 100 to the moving dolly board 52.

The lower plate 240 of the plate assembly 200 includes a central region 252 defining the opening 250 through which the connector 280 passes. A ball bearing raceway 256 is defined in an upper surface 254 of the lower plate. A plurality of ball bearings (not shown) is trapped between a base 312 of a yoke 310 of the yoke assembly 300 to facilitate rotation of the yoke assembly 300 with respect to the plate assembly 220, under loaded conditions of the caster assembly 100. A peripheral edge region 258 of the lower plate 240 is downturned and defines the annular notched ring 260. The notched ring 260 is mating part of the lock assembly 400 and includes the plurality of openings or notches 262.

In one exemplary embodiment the lower plate 240, the notched ring 260 includes four notches 262 spaced 90 degrees apart about the circumference of the ring 260. The bolt 412 of the spring lock 410 interfits into a selected notch 262a of the plurality of notches 262 in the second, locked position 404 of the lock assembly 400. The plurality of notches 262 provide that the relative rotational orientation between the plate assembly 200 and the yoke assembly 300 may be selected between one of four different orientations by a user of the caster assembly 100 when the caster assembly is used in the rigid configuration 110. In the rigid configuration 110 of the caster assembly 100, a direction of the caster wheel 350 of the yoke assembly 300 will determine a direction that the moving dolly 50 is constrained to travel. That is, when the caster assembly 100 is in the rigid configuration 100, the caster wheel 350 cannot swivel and, thus, will travel in a straight line along a direction or orientation of the wheel 350. This will similarly constrain the moving dolly 50 to move along a straight line of travel.

Yoke Assembly 300

The yoke assembly 300 includes the yoke 310 and the caster wheel 350. As can best be seen in FIG. 11, the yoke 310 includes the base 312 which is sandwiched between the upper and lower plates 210, 240. The connector 280 extends through a central opening 313 in the yoke base 312. A ball bearing raceway 316 is formed in an upper surface 314 of the base 312. A plurality of ball bearings (not shown) is trapped in the raceway 316 between the yoke base 312 and a lower surface of the top plate 210 to facilitate rotation of the yoke assembly 300 with respect to the plate assembly 220, under loaded conditions of the caster assembly 100. A schematic depiction of a plurality of ball bearings trapped in the raceway 316 is depicted in a third exemplary embodiment of the caster assembly shown in FIG. 32. Extending axially downward from an outer periphery of the yoke base 312 is a pedestal 320. At its lower end, the pedestal 320 terminates in a spaced apart pair of legs 330.

Advantageously, the pair of legs 330 of the yoke assembly 300 define a first set of horizontally aligned openings 332 and a second set of horizontally aligned openings 344. The first and second set of aligned openings 332, 344 provide for a selection of two different mounting positions for the caster wheel 350. Regarding of whether the first or second set of aligned openings 332, 344 is selected, the caster wheel 350 is rotatably mounted on a wheel axle 352 for rotation about the horizontal wheel axis WA (FIGS. 5 and 6). The wheel axle 352 includes a bolt 354 and a mating nut 356 to secure the caster wheel 350 in a vertically oriented position between the pair of legs 330 of the yoke assembly 300. The bolt 354, near its head is keyed such that the key fits into a keyed slot 334 of the first set of aligned openings 332 or the keyed slot 346 of the second set of aligned openings 344 such that the bolt 354 does not rotate when the nut 356 is threaded onto the bolt 354.

The first set of aligned openings 332 are used to mount the caster wheel 350 when the caster assembly 100 is used in the rigid configuration 110 (FIGS. 1-11). As can be seen in FIGS. 1-11, when the caster wheel 350 is mounted in the first set of aligned openings 332, advantageously, the horizontal wheel axis of rotation WA is orthogonal to and intersects the swivel axis of rotation SA (even though in the rigid configuration 110, the yoke assembly 300, including the caster wheel 350, is inhibited from swiveling or rotating about the swivel axis SA). This is best seen in FIG. 7. In this alignment orientation where the swivel axis SA and the wheel axis WA intersect, the caster assembly 100 has a maximum load bearing capability.

Figure 18:
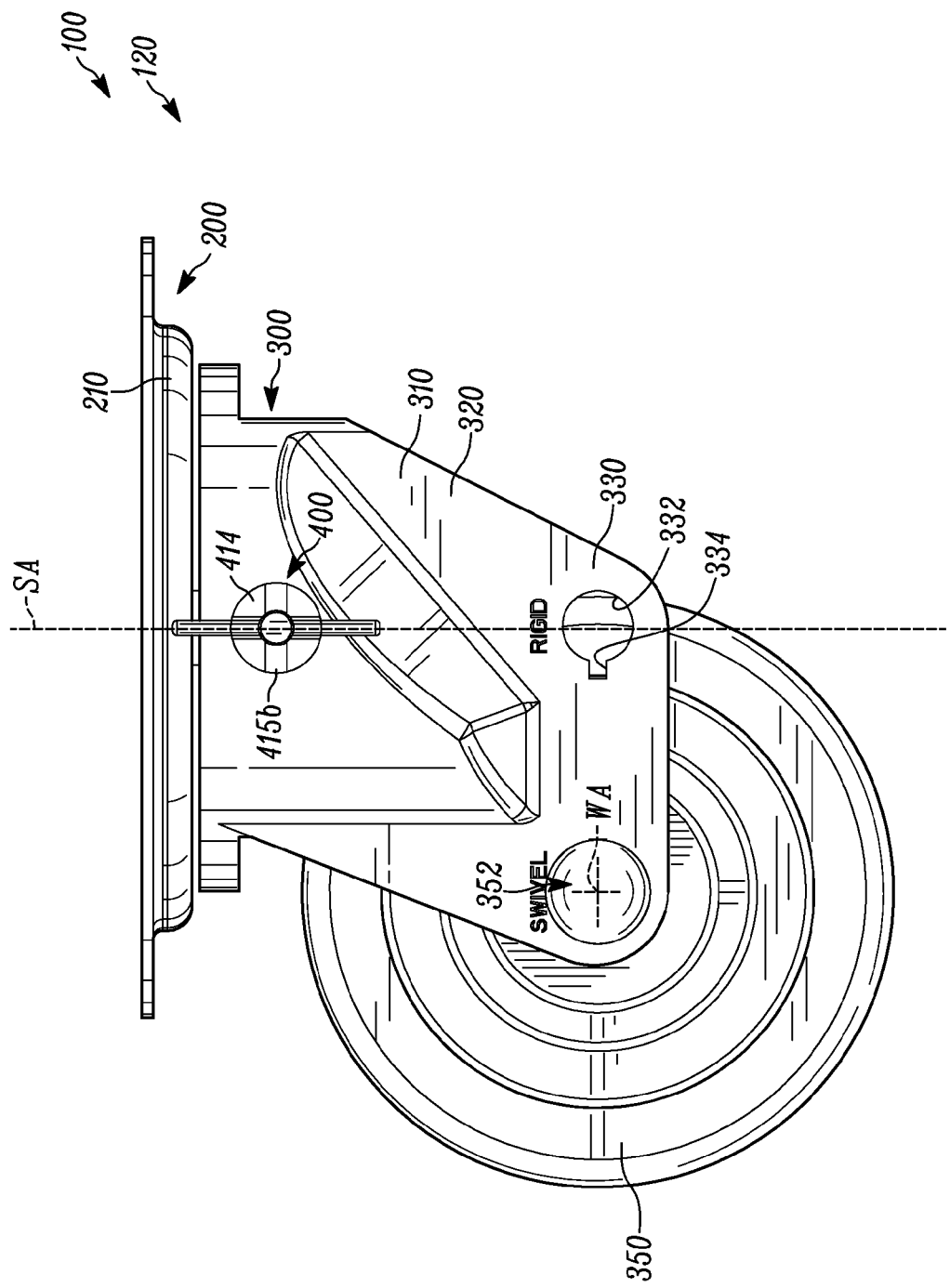
FIG. 18 is a schematic left side elevation view of the convertible caster assembly of FIG. 12.
Figure 19:
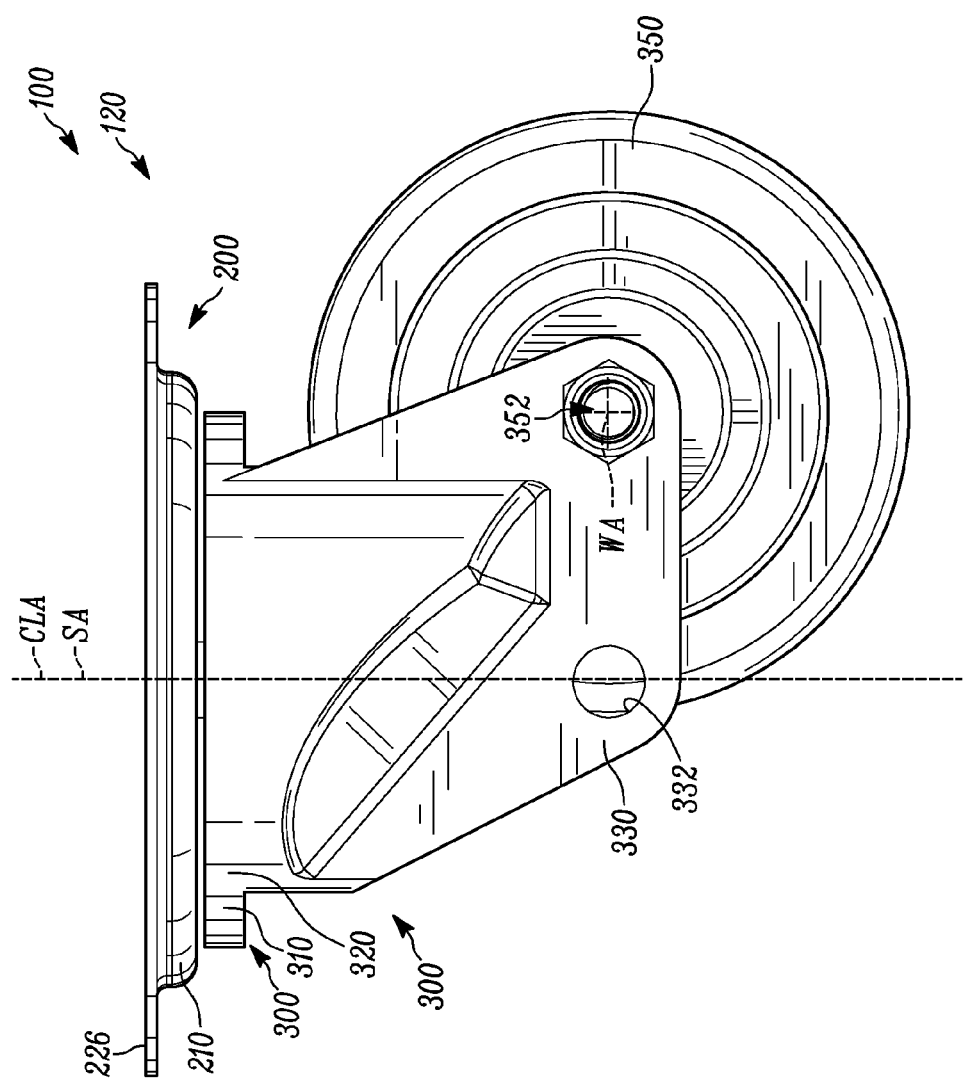
FIG. 19 is a schematic right side elevation view of the convertible caster assembly of FIG. 12.
Figure 20:
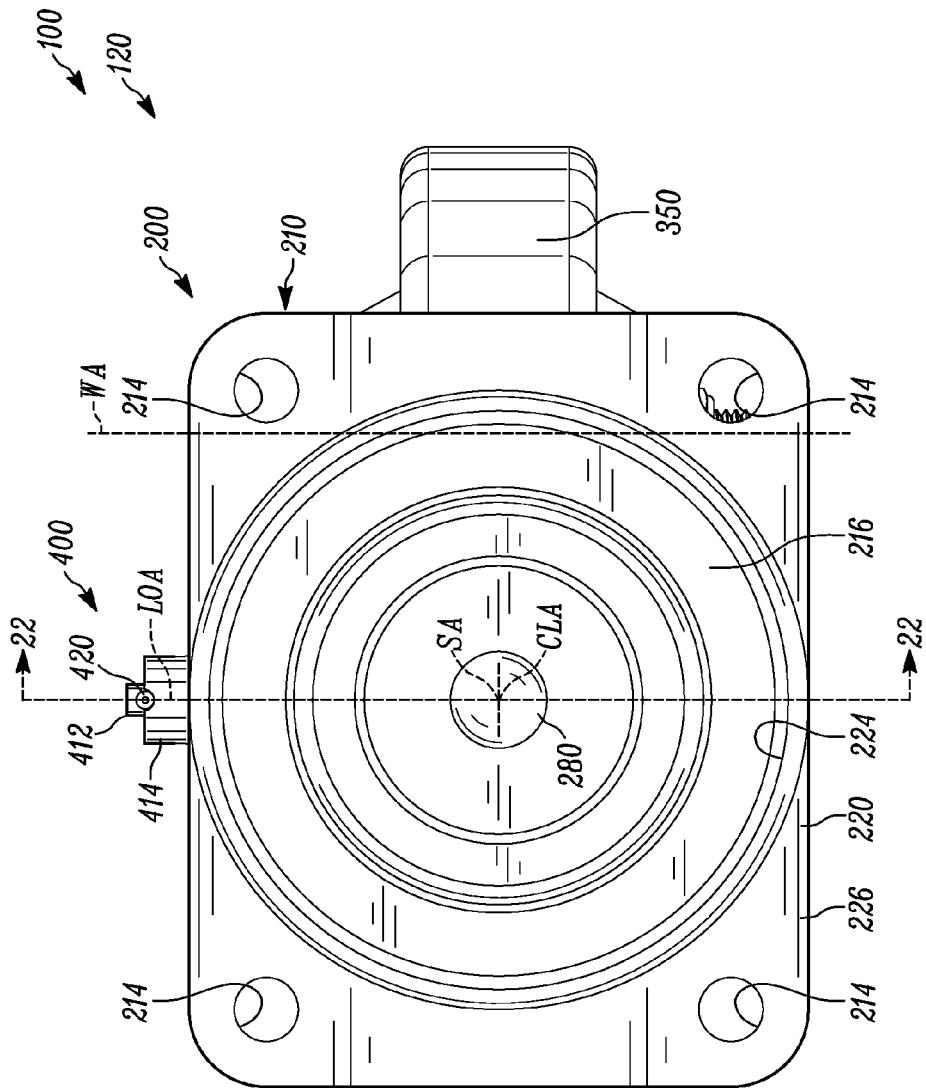
FIG. 20 is a schematic top plan view of the convertible caster assembly of FIG. 12.
Figure 21:
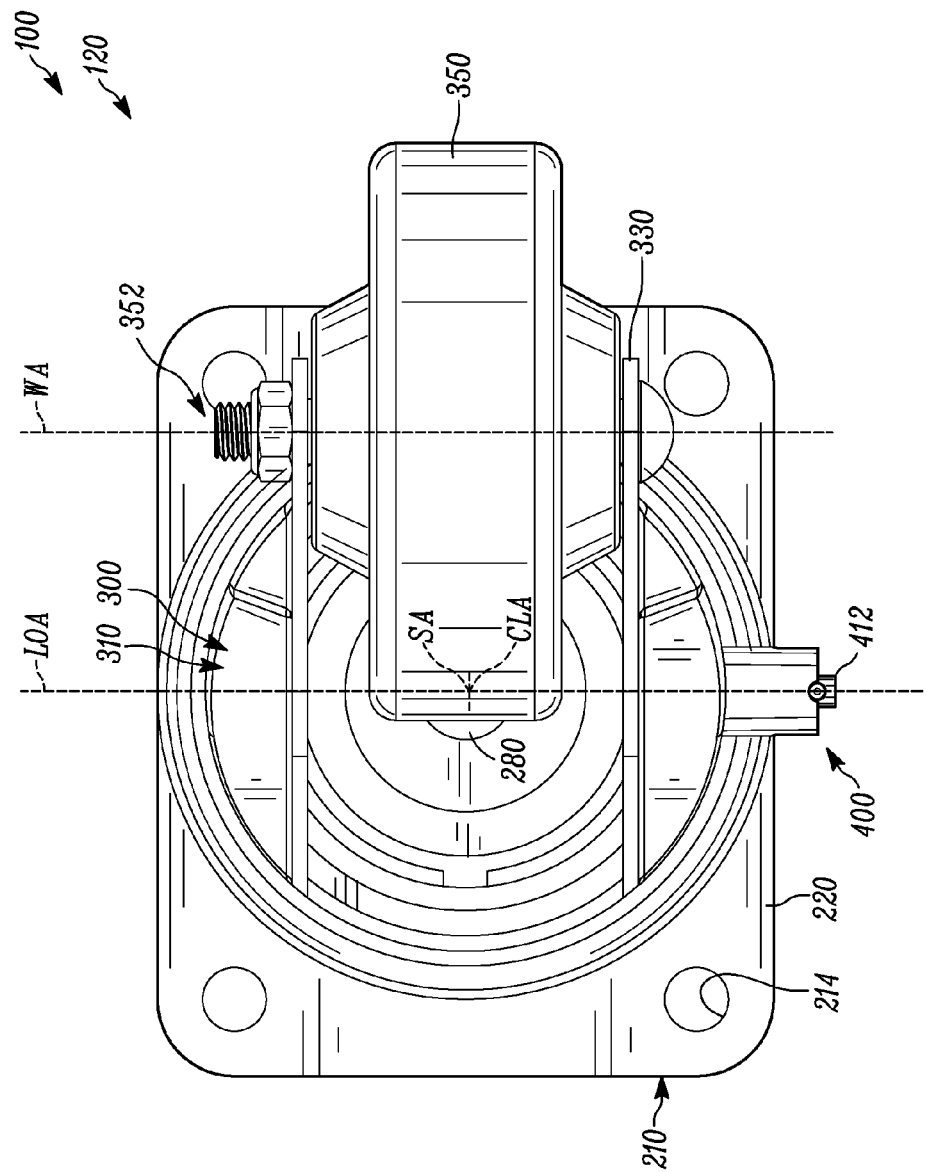
FIG. 21 is a schematic bottom plan view of the convertible caster assembly of FIG. 12.

By contrast, as can be seen in FIGS. 12-22, when the caster wheel 350 is mounted in the second set of aligned openings 332, advantageously, the horizontal wheel axis of rotation WA is orthogonal to but offset from the swivel axis of rotation SA. This is best seen in FIG. 18. The offset of the swivel axis SA from the wheel axis WA facilitates the swiveling of the yoke assembly 300, including the caster wheel 350, about the swivel axis SA. That is, even if the dolly 50 is pushed by the user in a direction that is 90 degrees offset from a direction of the caster wheel 350, the caster wheel 350 still freely rotate about the swivel axis SA to rotate and conform to the direction that the user is pushing the dolly 50. Thus, the first set of aligned openings 332 are used to mount the caster wheel 350 on the wheel axle 352 when the caster assembly 100 is to be used in the rigid condition or configuration 110 to provide for maximum load bearing ability, while the second set of aligned openings 344 are used to mount the caster wheel on the wheel axle 352 when the caster assembly 100 is to be used in the swiveling condition or configuration 120.

Lock Assembly 400

In one exemplary embodiment, the lock assembly 400 includes the spring lock 410 which is mounted to and extends through the pedestal 320 of the yoke 310 of the yoke assembly 300 and the notched ring 260 of the lower plate 240 of the plate assembly 200. The bolt 412, at an outer or proximal end, includes a grasping crosspiece 420 that allows the user to easily pull the bolt 412 radially outwardly against the bias of the spring 418 to move the bolt 412 between the unlocked and locked positions 402, 404.

Figure 12:
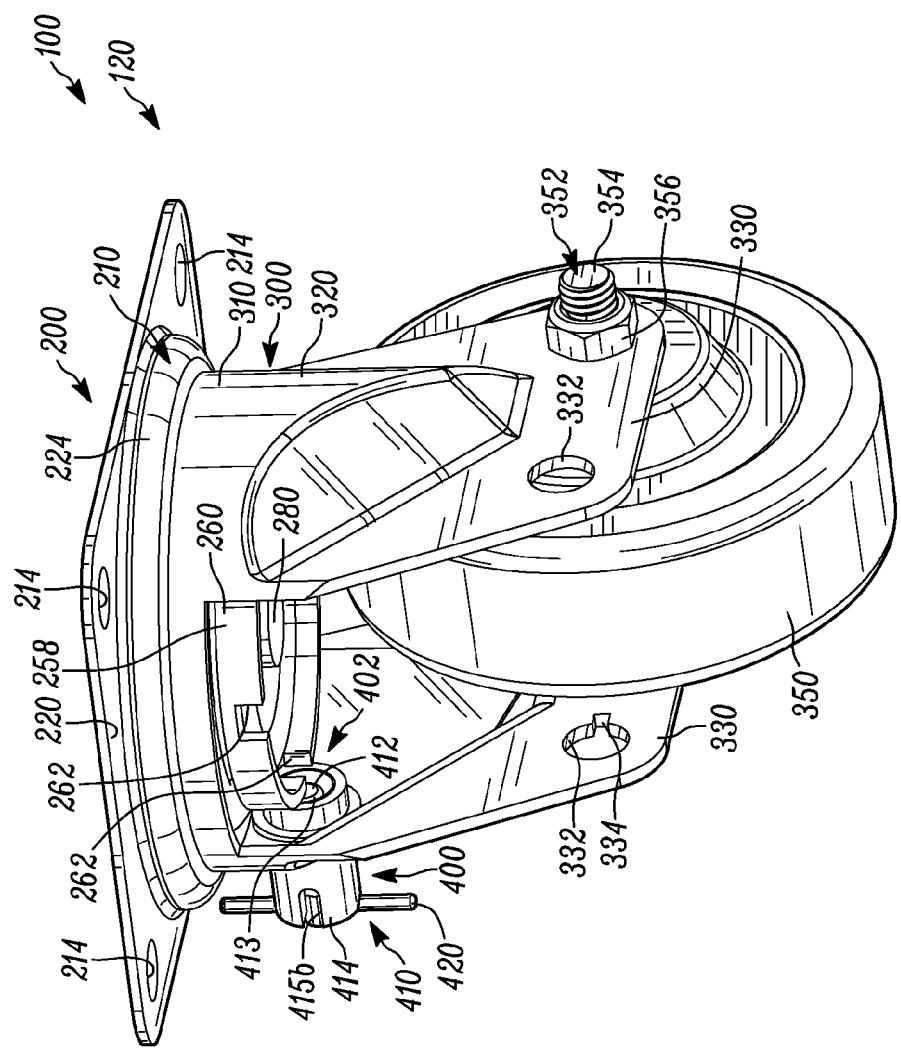
FIG. 12 is a schematic front, right side perspective view of the convertible caster assembly of FIG. 1, in a swiveling configuration wherein the yoke assembly of the caster assembly swivels with respect to the plate assembly of the caster assembly.
Figure 13:
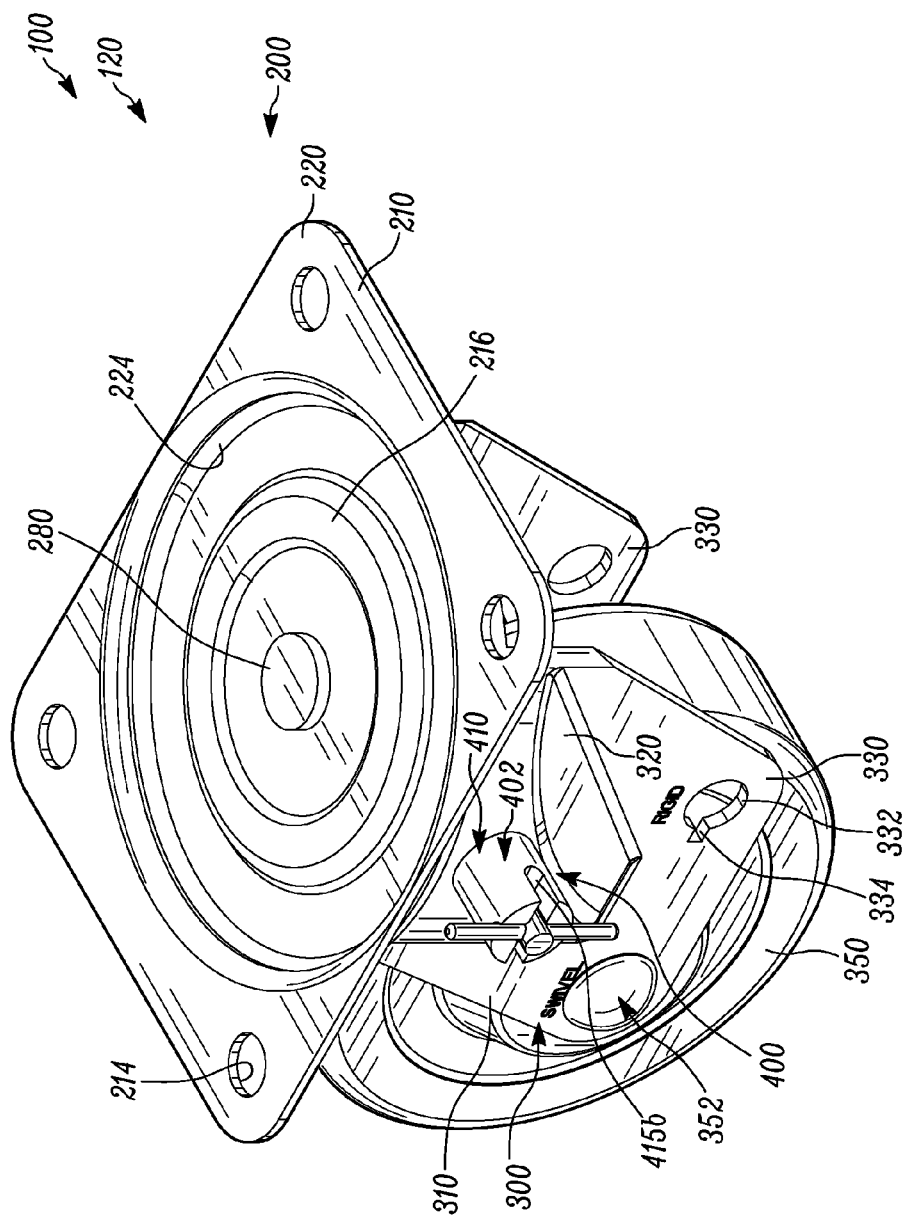
FIG. 13 is a schematic front, left side perspective view of the convertible caster assembly of FIG. 12.
Figure 14:
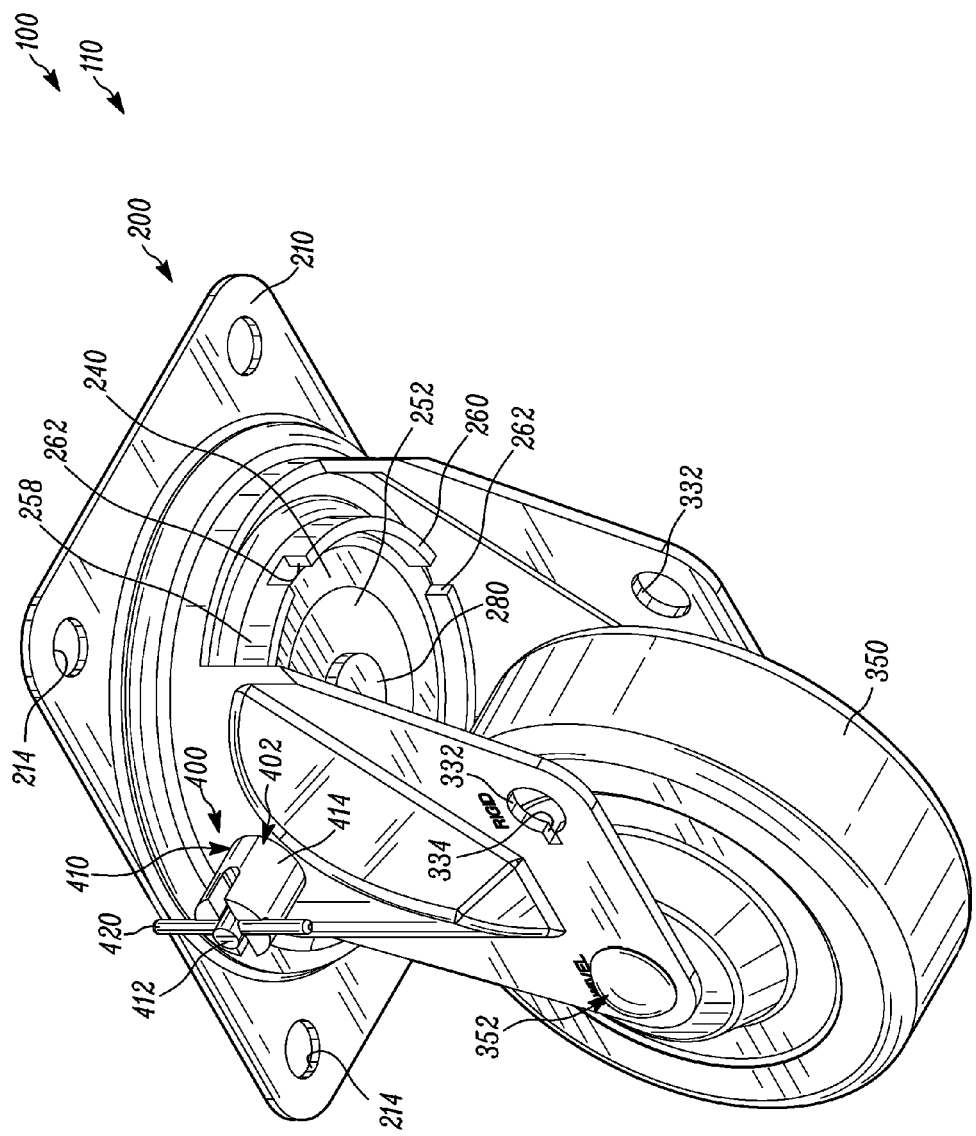
FIG. 14 is a schematic bottom, front, left side perspective view of the convertible caster assembly of FIG. 12.
Figure 15:
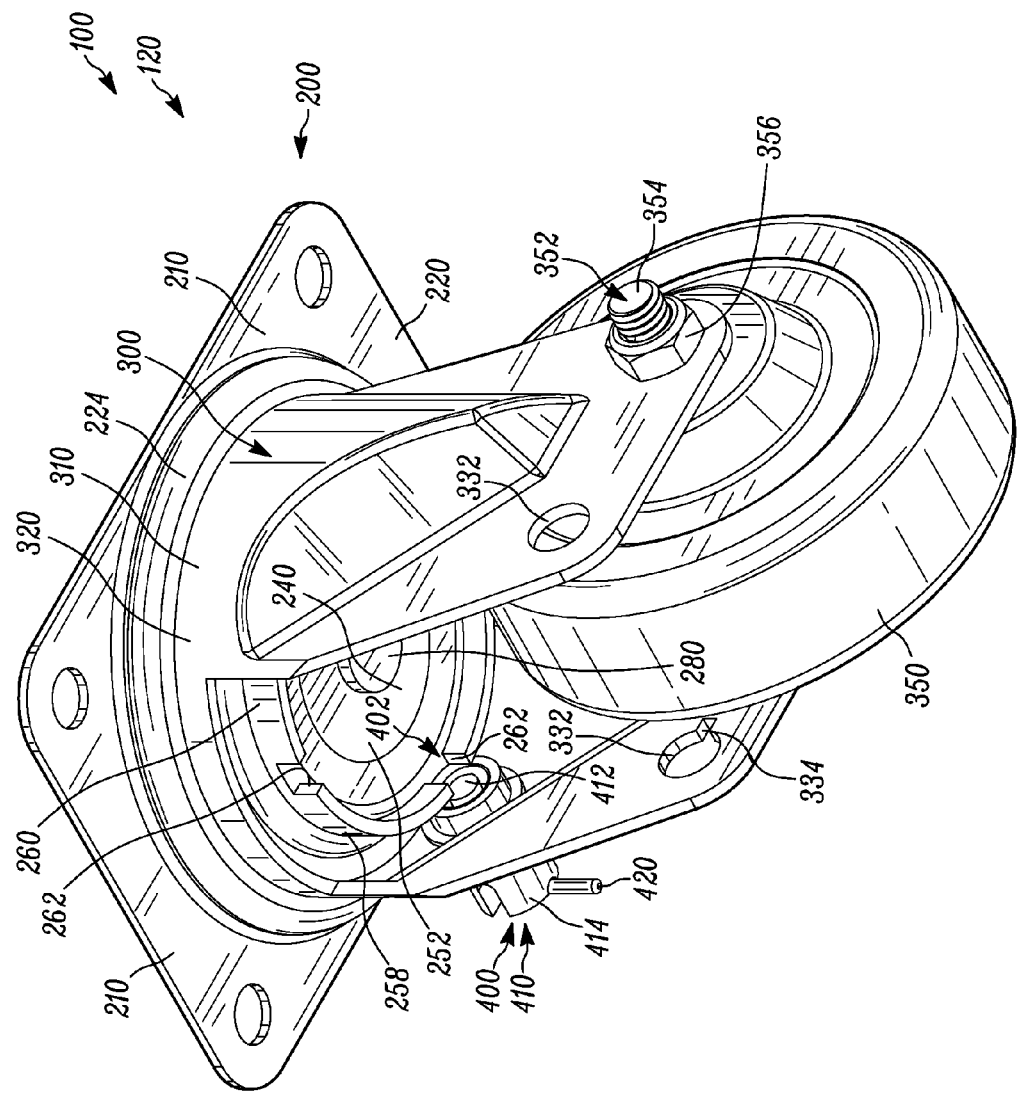
FIG. 15 is a schematic bottom, front, right side perspective view of the convertible caster assembly of FIG. 12.
Figure 16:
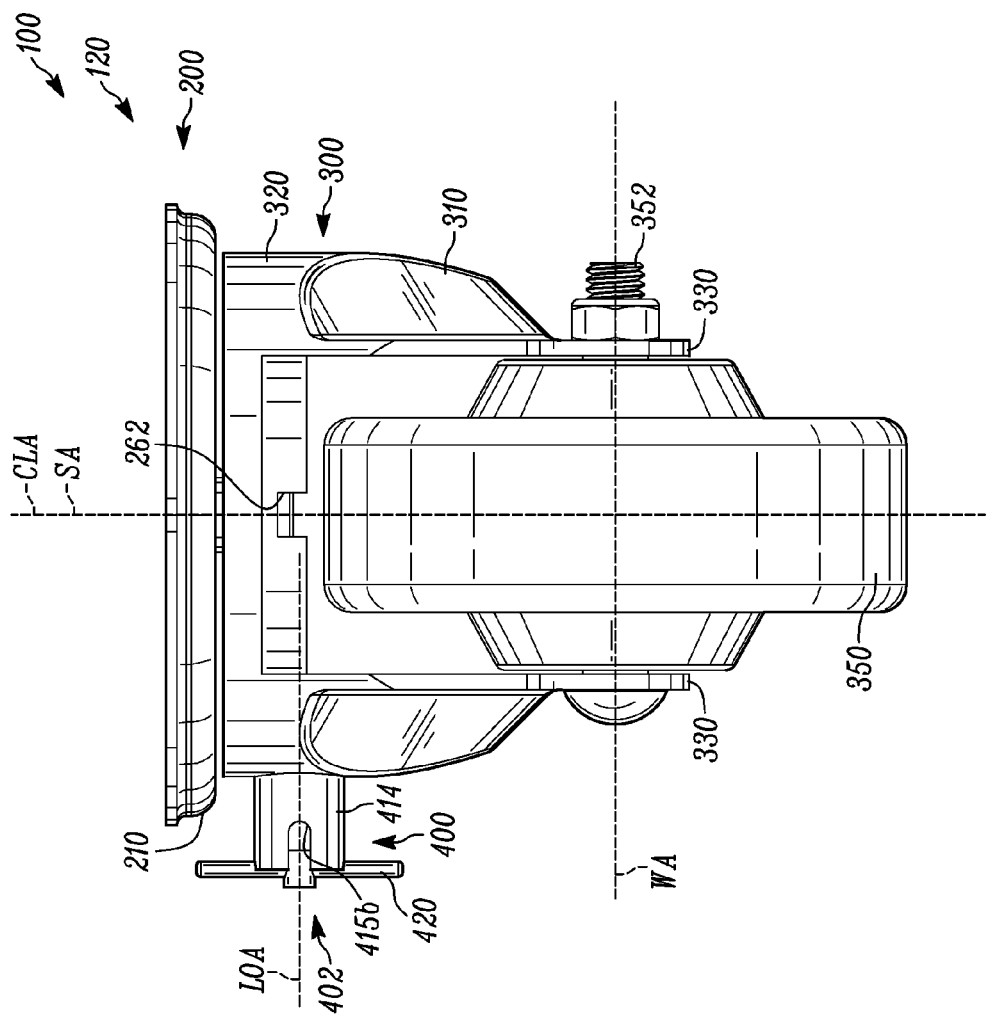
FIG. 16 is a schematic front elevation view of the convertible caster assembly of FIG. 12.
Figure 17:
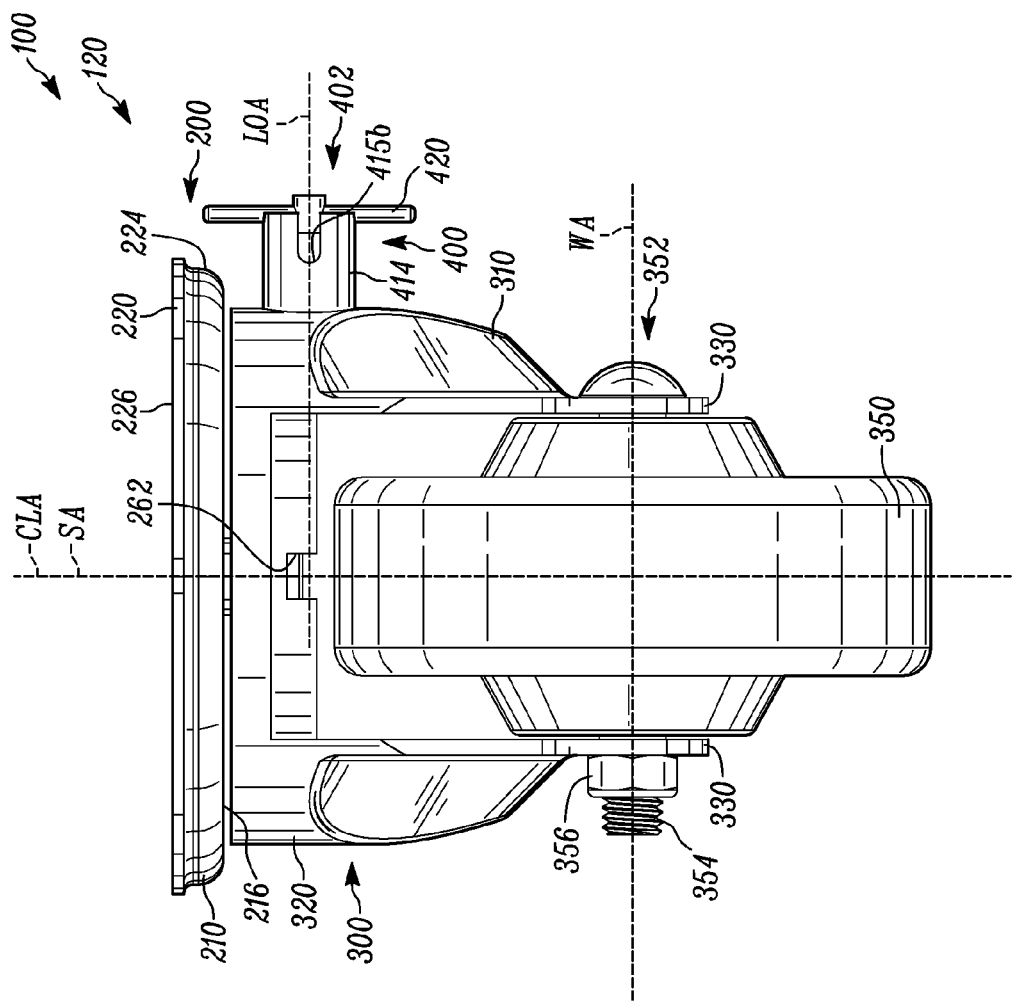
FIG. 17 is a schematic rear elevation view of the convertible caster assembly of FIG. 12.

The tubular sleeve 414 of the spring lock 410 includes a first set of shallow slots 415a and a second set of deeper slots 415b at its outer end. The first and second set of slots 415a, 415b receive the crosspiece 420 in one of two selected positions. When it is desired to have the spring lock 410 in the unlocked position 402, the crosspiece 420 is pulled outwardly and rotated such that the crosspiece 420 is received in the first set of shallow slots 415a. As is best seen in FIGS. 12 and 22, an inward or distal portion 413 of the bolt 412 is radially spaced from the plate assembly notched ring 260 and each of the plurality of detent notches 262 of the notched ring 260. Thus, when the crosspiece 420 is received in the first set of shallow slots 415a, the bolt 412 is clear from the notched ring 260, the lock assembly 400 is in the unlocked position 402 and the yoke assembly 300 is free to rotate about the swivel axis SA with respect to the support or plate assembly 200. The convertible caster assembly 100 is in the swiveling configuration 120.

By contrast, when it is desired to have the spring lock 410 in the locked position 404, the crosspiece 420 is pulled outwardly and rotated such that the crosspiece 420 is received in the second set of deeper slots 415b. As is best seen in FIGS. 1 and 11, the distal portion 413 of the bolt 412 extends into and interfits within the selected detent notch 262a of the plate assembly notched ring 260. Thus, the interfitting of the bolt 412 and the detent notch 262a inhibits relative rotation between the yoke assembly 300 and the plate assembly 200. Thus, the lock assembly 400 is in the locked position 404 and the yoke assembly 300 are constrained from free rotation about the swivel axis SA. The convertible caster assembly 100 is in the non-swiveling or rigid configuration 110.

Second Exemplary Embodiment

Caster Assembly 500

A second exemplary embodiment of the convertible caster assembly of the present disclosure is shown at 500 in FIGS. 23-27. The convertible caster assembly 500 is similar to the convertible caster assembly 100, as previously described and shown in FIGS. 1-22, except for the yoke assembly 700. As can be seen in FIGS. 23-27, the yoke assembly 700 includes a yoke 710 and the caster wheel 750. The caster wheel 750 is similar to the caster wheel 350, previously described.

The yoke 710 includes a base 712 which is sandwiched between the upper and lower plates 610, 640 of the plate assembly 600. The base 712 of the yoke 710 is similar to the base 312 of the yoke 310 of the caster assembly 100 of the first exemplary embodiment. Extending axially downward from an outer periphery 714 of the yoke base 712 is a pedestal 720. At its lower end, the pedestal 720 terminates in a spaced apart pair of legs 730.

Advantageously, the pair of legs 730 of the yoke assembly 700 define a pair of horizontally aligned slots 732. A central portion 733 of each of the slots 732 is generally arcuate in shape, that is, the slots 732 curve or bend upwardly in a direction of the plate assembly 200. A curved central axis CCP of the central portion 733 is shown schematically in FIG. 27. The curved central axis CCP of the respective horizontally extending central portions 733 of the longitudinal slots 734 curves upwardly toward the upper planar surface UPS defined by the upper plate 610. The upper planar surface UPS defined by the upper plate 610 is also parallel to the horizontal wheel axis of rotation WA of the caster wheel 750 and orthogonal to a swivel axis of rotation SA of the yoke assembly 700, as described above with respect to the caster assembly 100 of the first exemplary embodiment. The opposite end portions 734, 736 of the arcuate slots 732 provide for a selection of two different mounting positions for the caster wheel 750. Specifically, the end portions 734, 736 of the arcuate slots 732 define inverted, U-shaped openings 744, 746. The inverted, U-shaped openings 744, 746 of the end portions 734, 736 of the arcuate slots 733 are slightly offset in an upward direction from the general extent or central axis CCP of the respective arcuate slots 734 and thus define the two stable mounting positions for the caster wheel 740. That is, the caster wheel 750 includes a wheel axle 752 comprising a bolt 754 and a nut 756 which provide for rotational attachment of the caster wheel 750 to the pair of legs 730 of the yoke assembly 700.

Figure 23:
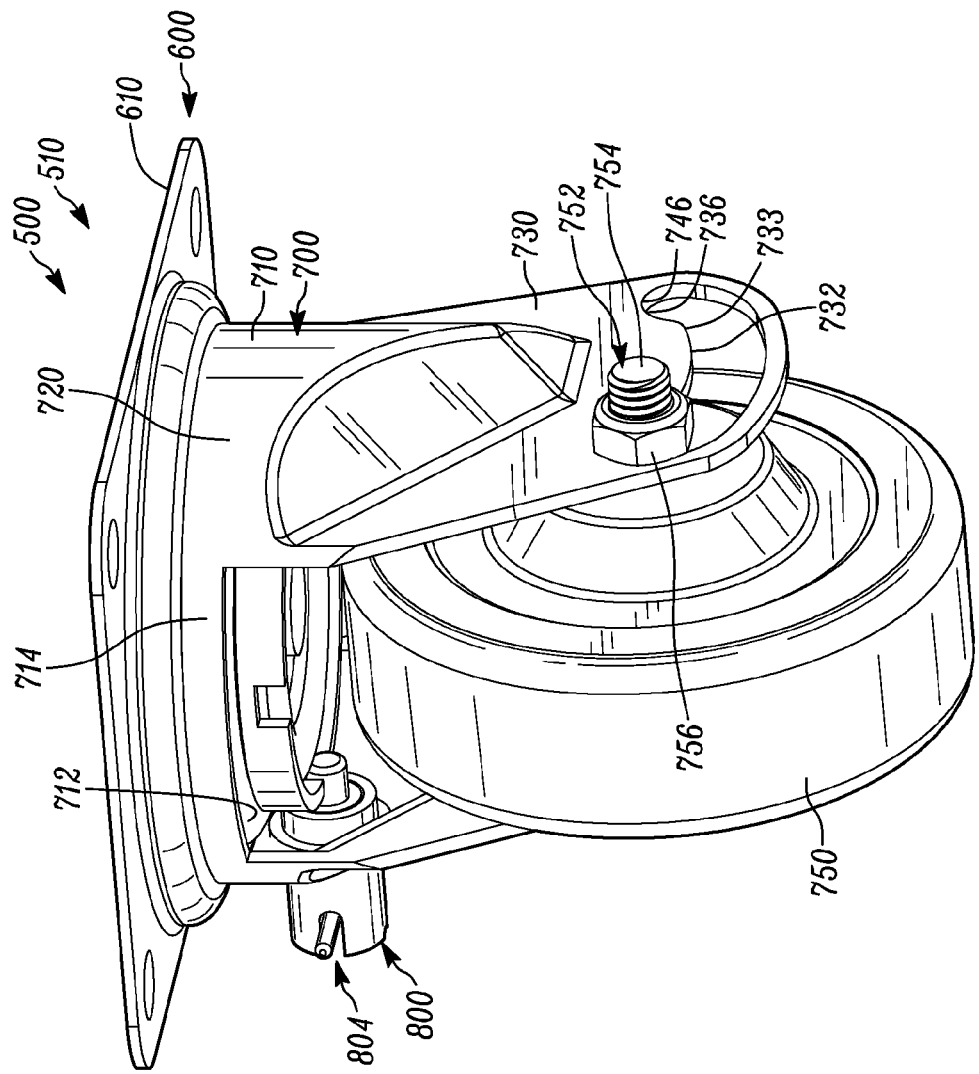
FIG. 23 is a schematic front, right side perspective view of a second exemplary embodiment of a convertible caster assembly of the present disclosure, in a non-swiveling or rigid configuration wherein a yoke assembly of the caster assembly does not swivel with respect to a support or plate assembly of the caster assembly.
Figure 24:
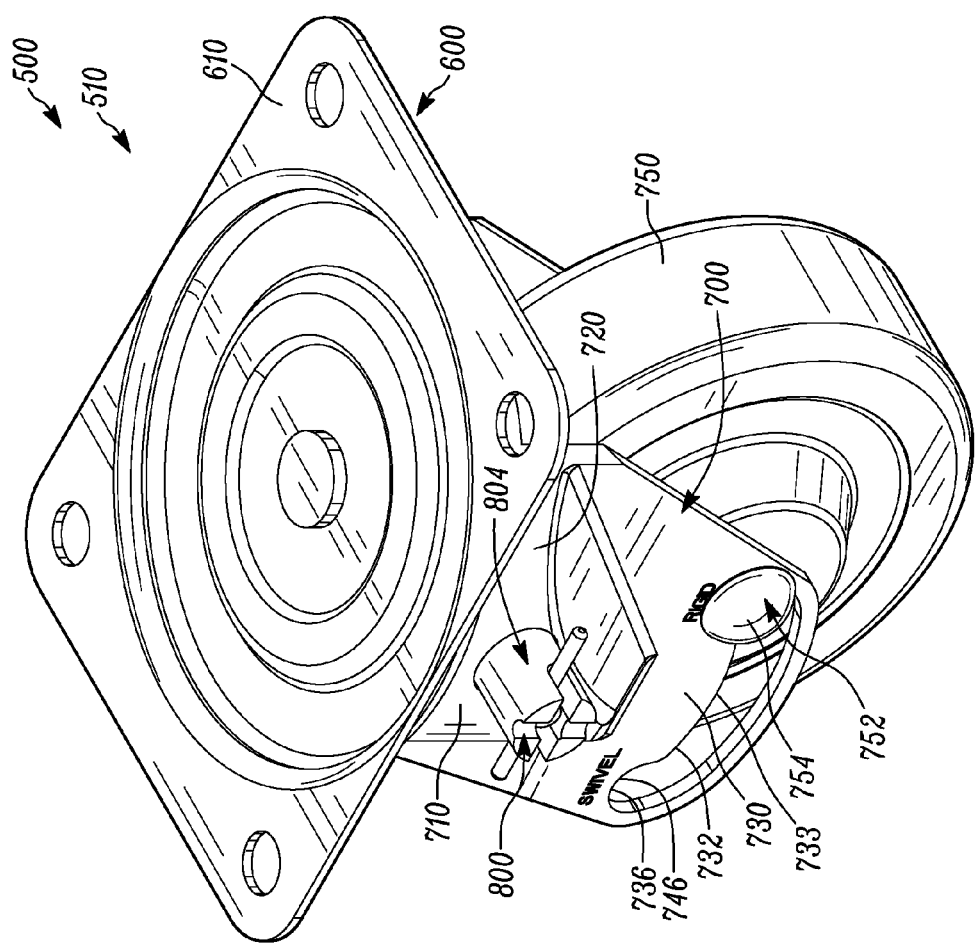
FIG. 24 is a schematic front, left side perspective view of the convertible caster assembly of FIG. 23.
Figure 25:
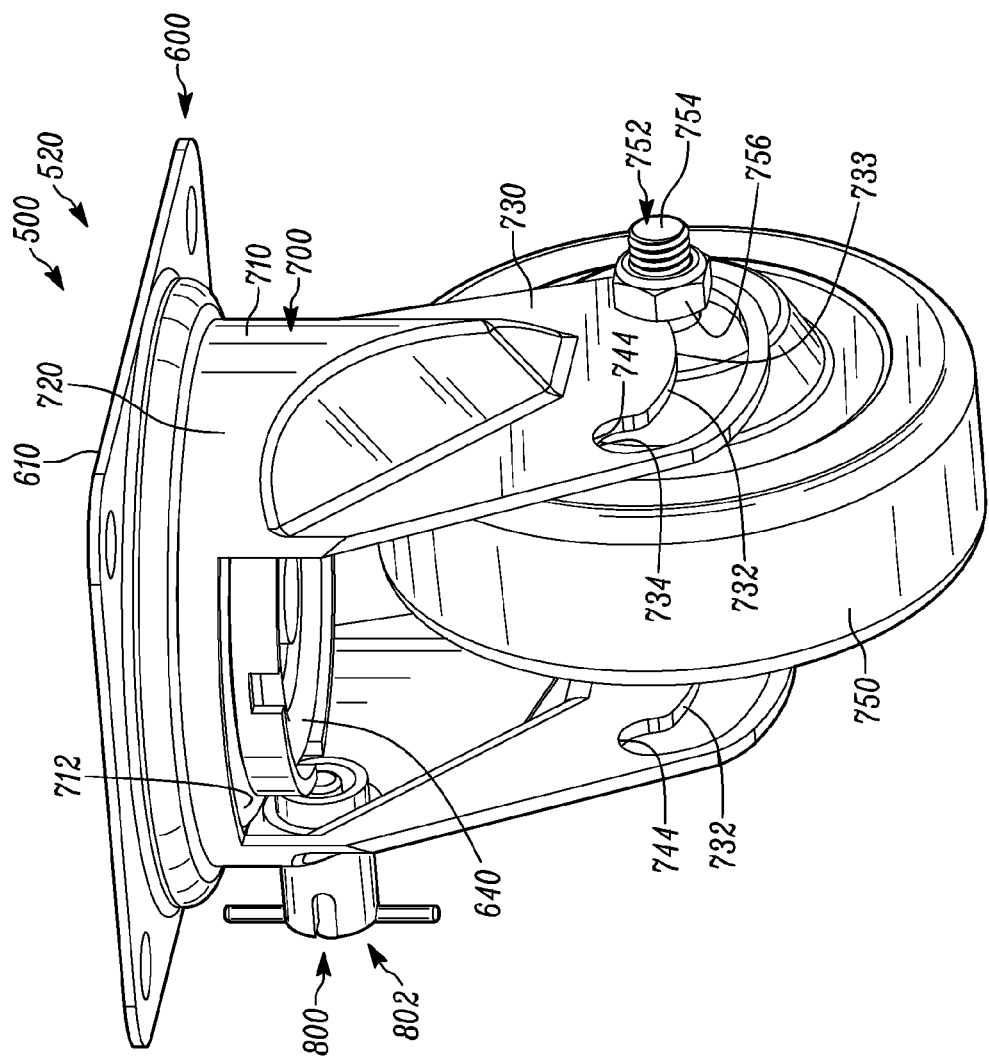
FIG. 25 is a schematic front, right side perspective view of the convertible caster assembly of FIG. 23, in a swiveling configuration wherein the yoke assembly of the caster assembly with respect to the plate assembly of the caster assembly.
Figure 26:
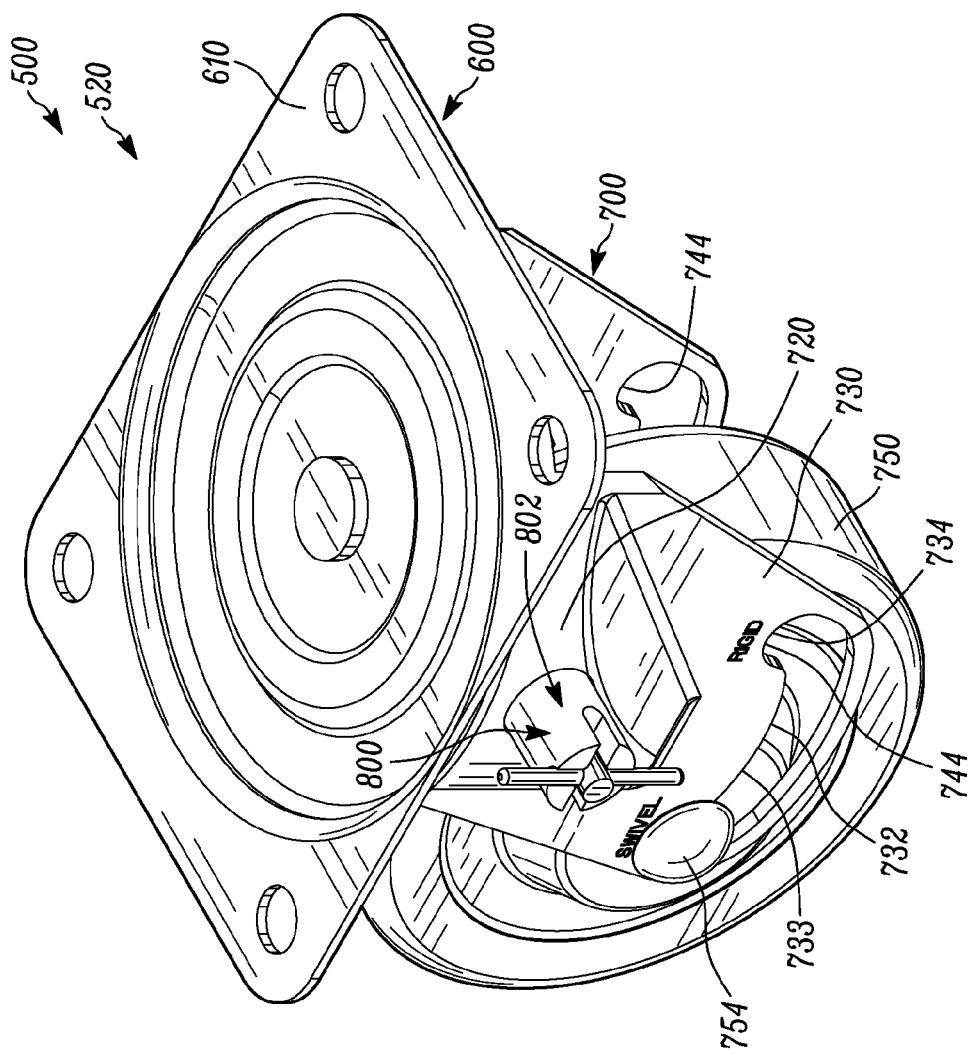
FIG. 26 is a schematic front, left side perspective view of the convertible caster assembly of FIG. 23.
Figure 27:
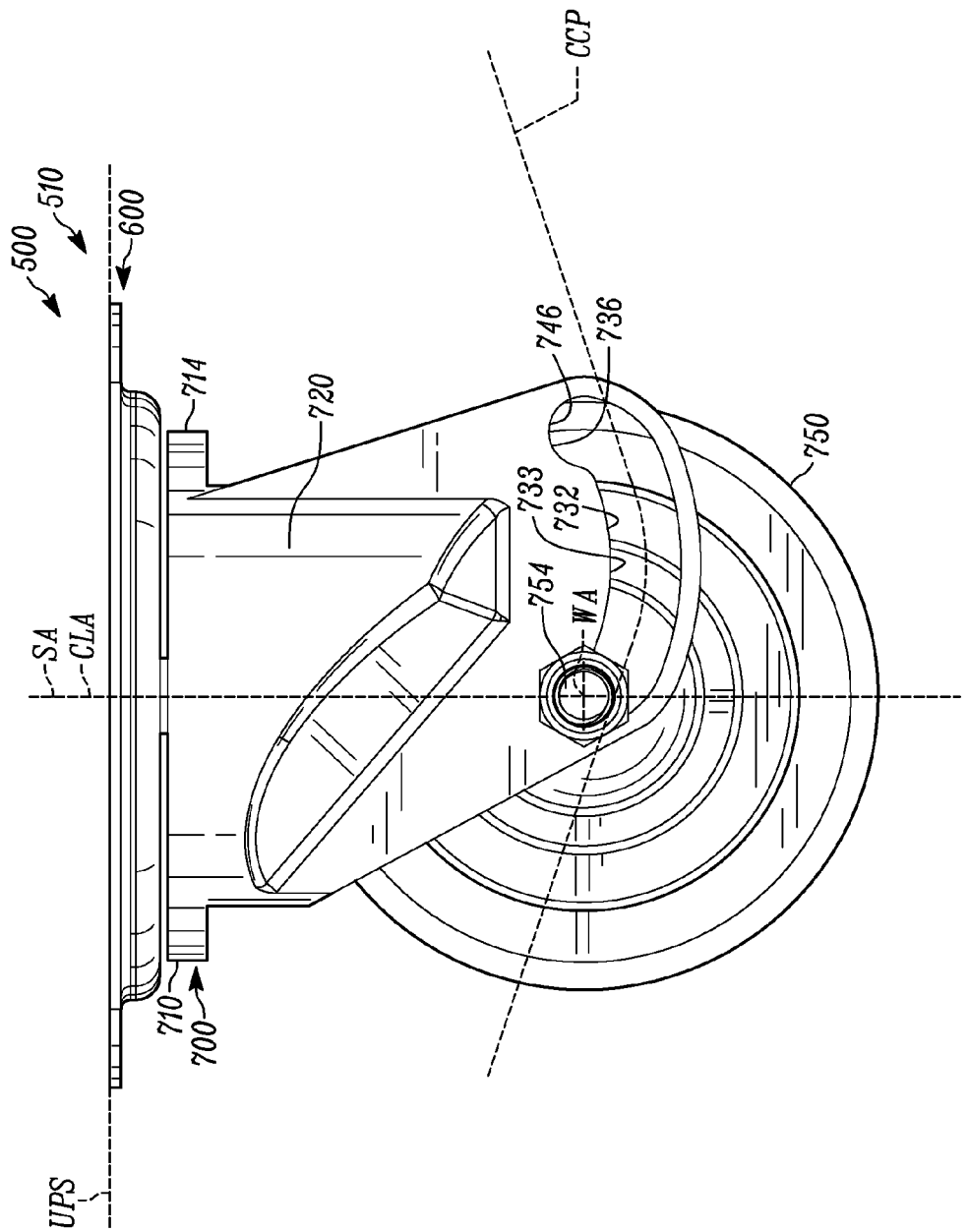
FIG. 27 is a schematic right side elevation view of the convertible caster assembly of FIG. 23 in the rigid configuration.

The wheel axle 752, which defines the horizontal wheel axis WA of the caster wheel 750, is securely received in the first U-shaped openings 744 (FIGS. 23 and 24) in a first mounting position, corresponding to the rigid configuration 510 of the caster assembly 500 (FIGS. 23, 24 and 27). The first mounting position defined by the U-shaped openings 744 corresponds to the rigid configuration 110 of the caster assembly 100. Alternatively, the wheel axle 752 is securely received in the second U-shaped openings 746 in a second mounting position, corresponding to the swiveling configuration 520 of the caster assembly 500 (FIGS. 25 and 26). The second mounting position defined by U-shaped openings 746 corresponds to the swiveling configuration 120 of the caster assembly 100.

As previously described with respect to the wheel axle 352, the wheel axle 752 also includes the bolt 754 and the mating nut 756 to secure the wheel axle 752 to the pair of legs 730 of the yoke assembly 700 and thereby affix the caster wheel 750 in a vertically oriented position between the pair of legs 730 of the yoke assembly 730. The aligned U-shaped openings 744 are used to mount the caster wheel 750 when the caster assembly 700 is used in the rigid configuration 510 (FIGS. 23, 24 and 27). As can be seen in FIG. 27, when the caster wheel 750 is mounted in the first set of aligned openings 744, advantageously, the horizontal wheel axis of rotation WA is orthogonal to and intersects the swivel axis of rotation SA (even though in the rigid configuration 510, the yoke assembly 700, including the caster wheel 750, is inhibited from swiveling or rotating about the swivel axis SA). In the rigid alignment orientation 510 where the swivel axis SA and the wheel axis WA intersect, the caster assembly 500 has a maximum load bearing capability.

By contrast, as can be seen in FIGS. 25 and 26, in the swiveling configuration 520, when the caster wheel 750 is mounted in the second set of aligned, U-shaped openings 746, advantageously, the horizontal wheel axis of rotation WA is orthogonal to but is spaced from or offset from the swivel axis of rotation SA. The offset of the swivel axis SA from the wheel axis WA facilitates the swiveling of the yoke assembly 700, including the caster wheel 750, about the swivel axis SA. That is, even if the dolly 50 (FIG. 1) is pushed by the user in a direction that is 90 degrees offset from a direction of the caster wheel 750, the caster wheel 750 still freely rotate about the swivel axis SA to rotate and conform to the direction that the user is pushing the dolly 50.

Thus, the first set of aligned U-shaped openings 744 are used to position the wheel axle 752 and the caster wheel 750 with respect to the to the yoke 710 such that the horizontal wheel axis of orientation WA intersects the swivel axis of rotation SA when the caster assembly 500 is to be used in the rigid condition or configuration 510 to provide for maximum load bearing ability, while the second set of aligned openings 746 are used to position the wheel axle 752 and the caster wheel 750 with respect to the to the yoke 710 such that the horizontal wheel axis of orientation WA is orthogonal to but offset from the swivel axis of rotation SA when the caster assembly 500 is to be used in the swiveling condition or configuration 520.

Advantageously, when it is desired to change the wheel axle 752 from the rigid configuration 510 to the swiveling configuration 520 or vice versa, the user need only loosen the nut 756 from the bolt 754 sufficiently to allow the wheel axle 752 to be slidingly moved along the aligned slots 732 from the horizontally aligned, U-shaped openings 744 to the horizontally aligned, U-shaped openings 746 and then retighten the nut 756 with respect to the bolt 754 to secure the wheel axle 752 in the openings 746 and thereby have the caster assembly 500 in the swiveling configuration 520. That is, the wheel axle 752 does not have to be removed from the aligned slots 732 of the pair of legs 730 of the yoke assembly 700 to move or slide the wheel axle 752 along the aligned slots 732 from the first mounting position defined by U-shaped opening 744 (corresponding to the rigid configuration 510) to the second mounting position defined by U-shaped opening 746 (corresponding to the swiveling configuration 520).

Similarly, to change the wheel axle 752 from the second mounting position defined by the U-shaped opening 746 (the swiveling configuration 520) to the first mounting position defined by the U-shaped opening 744 (the rigid configuration 510) the process is reversed. Again, the wheel axle 752 never has to be removed from the aligned slots 732 to move or slide the wheel axle 752 from the second mounting position (U-shaped opening 746) to the first mounting position (U-shaped opening 744). The nut 756 needs only to be sufficiently loosened from the bolt 754 to allow the wheel axle 752 to slide in the slots 732 between the openings 744, 746, as desired, and then the nut 756 is retighten to secure the wheel axle 752. Of course, as described above with respect to the caster assembly 100, for the caster assembly 500 to be in the non-swiveling or rigid configuration 110, in addition to the wheel axle 752 being secured in the U-shaped opening 744, a lock assembly 800 must also be in the locked position 804 (FIGS. 23 and 24). The lock assembly 800 of the second exemplary embodiment of the caster assembly 500 is similar in all respects to the lock assembly 400 of the first exemplary embodiment caster assembly 100. Similarly, for the caster assembly 500 to be in the swiveling configuration 520, in addition to the wheel axle 752 being secured in the U-shaped opening 746, the lock assembly 800 must also be in the unlocked position 802 (FIGS. 25 and 26).

Third Exemplary Embodiment

Caster Assembly 1500

A third exemplary embodiment of the convertible caster assembly of the present disclosure is shown at 1500 in FIGS. 28-32. The convertible caster assembly 1500 is similar to the convertible caster assembly 500, as previously described and shown in FIGS. 23-27, and the convertible caster assembly 100, as previously described and shown in FIGS. 1-22, except for the yoke assembly 1700. As can be seen in FIGS. 28-32, the yoke assembly 1700 includes a yoke 1710 and the caster wheel 1750. The caster wheel 1750 is similar to the caster wheels 750, 350, previously described.

The yoke 1710 includes a base 1712 which is sandwiched between the upper and lower plates 1610, 1640 of the plate assembly 1600. The base 1712 of the yoke 1710 is similar to the base 712 of the yoke 710 of the second exemplary embodiment caster assembly 500. Extending axially downward from an outer periphery 1714 (FIG. 28) of the yoke base 1712 is a pedestal 1720. At its lower end, the pedestal 1720 terminates in a spaced apart pair of legs 1730.

Figure 30:
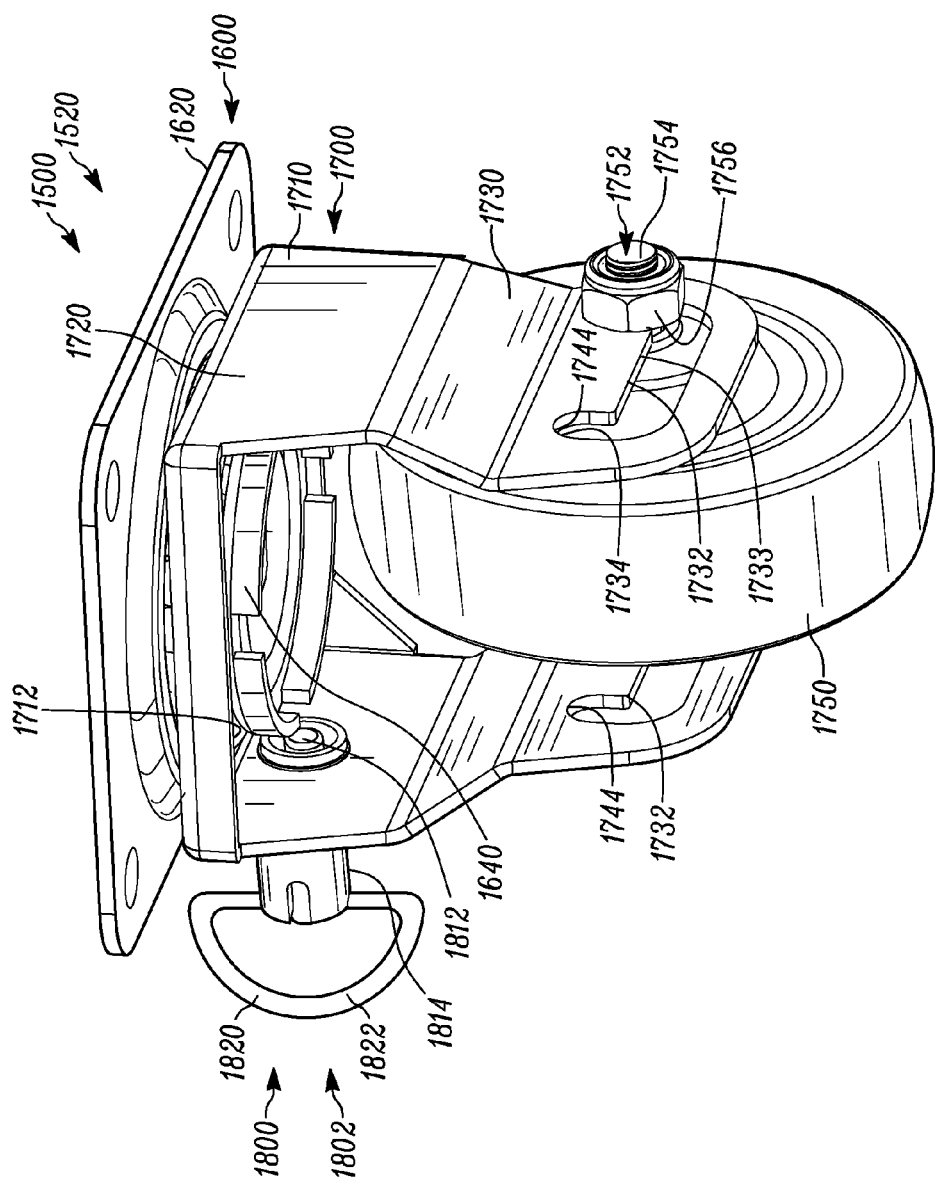
FIG. 30 is a schematic front, right side perspective view of the convertible caster assembly of FIG. 28, in a swiveling configuration wherein the yoke assembly of the caster assembly with respect to the plate assembly of the caster assembly.
Figure 31:
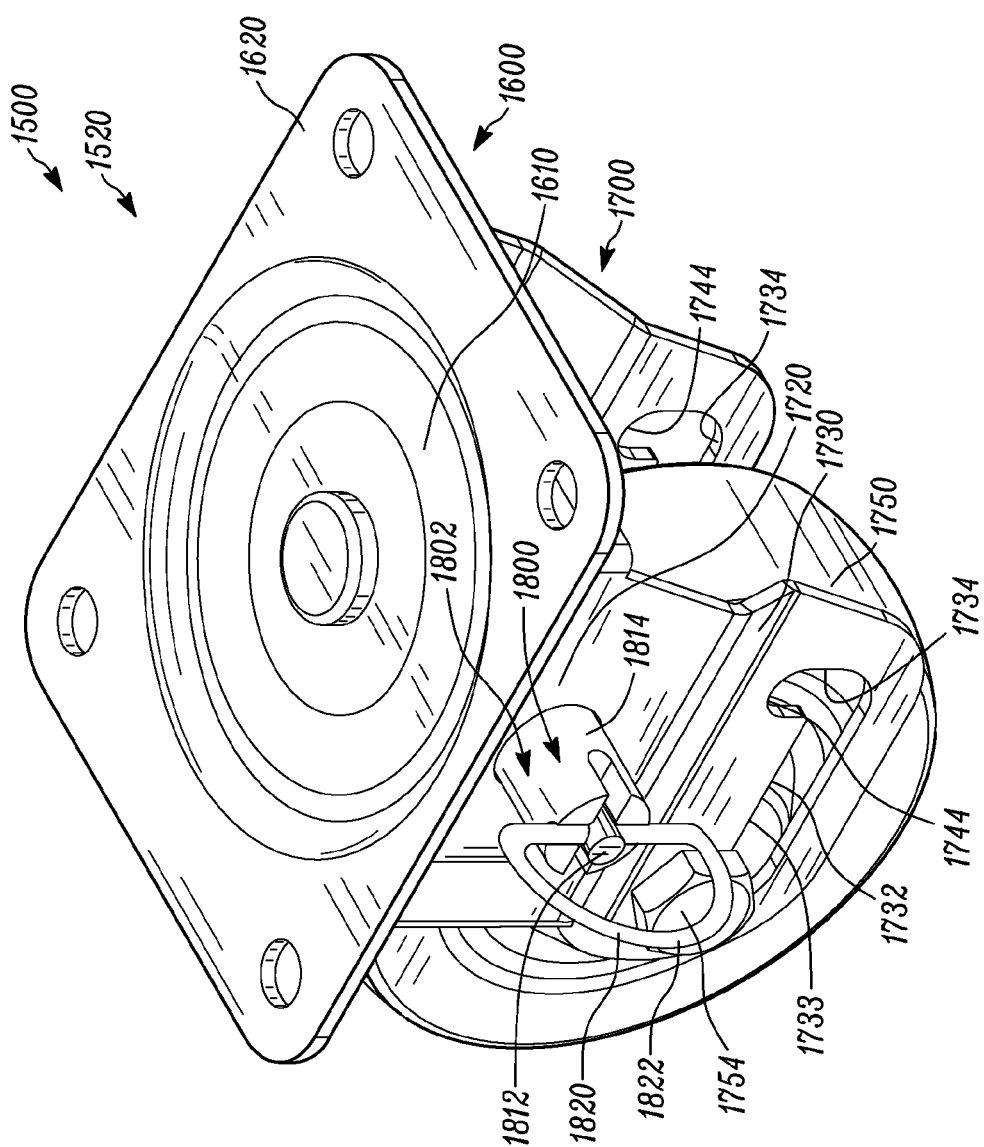
FIG. 31 is a schematic front, left side perspective view of the convertible caster assembly of FIG. 28.
Figure 32:
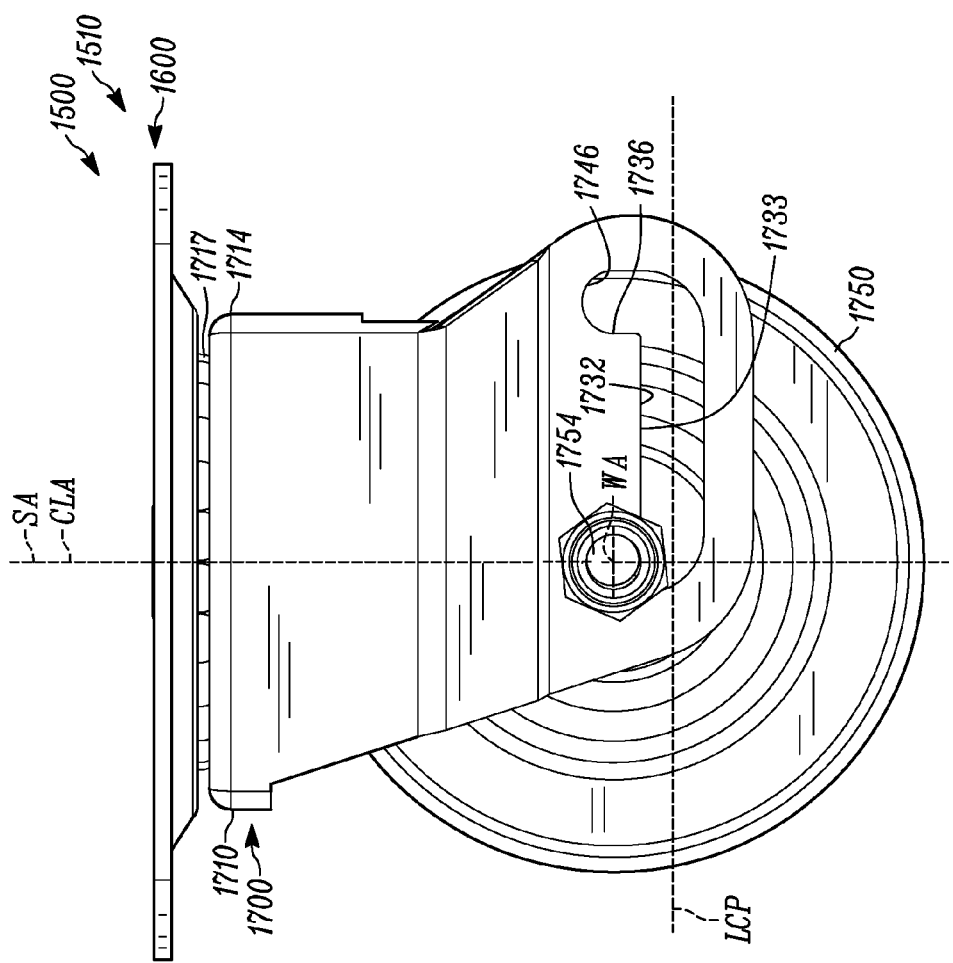
FIG. 32 is a schematic right side elevation view of the convertible caster assembly of FIG. 23 in the rigid configuration.

In the third exemplary embodiment of the convertible caster assembly 1500, advantageously, the pair of legs 1730 of the yoke assembly 1700 define a pair of horizontally aligned longitudinally extending truncated U-shaped slots 1732. As contrasted with the arcuately shaped slots 732 of the second exemplary embodiment of the convertible caster assembly 500, the longitudinally extending slots 1732 include a horizontally extending linear central portion 1733 and vertically extending opposite end portions 1734, 1736. As can be seen in FIGS. 28-32, the end portions 1734, 1736 extend orthogonally upwardly at opposite ends of the generally horizontal linear central portion 1733. The horizontal linear central portion 1733 defines a general extent or linear central axis LCP (FIG. 32). Unlike the slots 732 of the convertible caster assembly 500 which curve or bend upwardly along the curved central axis CCP in a direction of the plate assembly 200, the horizontally extending linear central portion 1733 of each of the slots 1732 is substantially linear and parallel to an upper planar surface UPS defined by an outer peripheral region 1620 of the upper plate 1610. As with the second embodiment of the caster assembly 500, the opposite end portions 1734, 1736 of the longitudinally extending slots 1732 provide for a selection of two different mounting positions for the caster wheel 1750. Specifically, the vertically extending end portions 1734, 1736 of the longitudinal slots 1732 define inverted, U-shaped openings 1744, 1746 at the respective upper regions of each of the end portions 1734, 1736.

The end portions 1734, 1736 of the longitudinally extending slots 1732 are offset in an upward, vertical direction from the general extent or linear central axis LCP (FIG. 32) of the respective horizontally extending central portions 1733 of the longitudinal slots 1734. Thus, the inverted, U-shaped openings 1744, 1746 defined by the vertically extending end portions 1734, 1736 define the two stable mounting positions for the caster wheel 1750. That is, the caster wheel 1750 includes a wheel axle 1752 comprising a bolt 1754 and a nut 1756 which provide for rotational attachment of the caster wheel 1750 to the pair of legs 1730 of the yoke assembly 1700. The linear central axis LCP of the respective horizontally extending central portions 1733 of the longitudinal slots 1734 is substantially horizontal, that is, parallel to an upper planar surface UPS defined by the upper plate 1610. The upper planar surface UPS defined by the upper plate 1610 is also parallel to the horizontal wheel axis of rotation WA and orthogonal to the swivel axis of rotation SA of the yoke assembly 1700.

Figure 28:
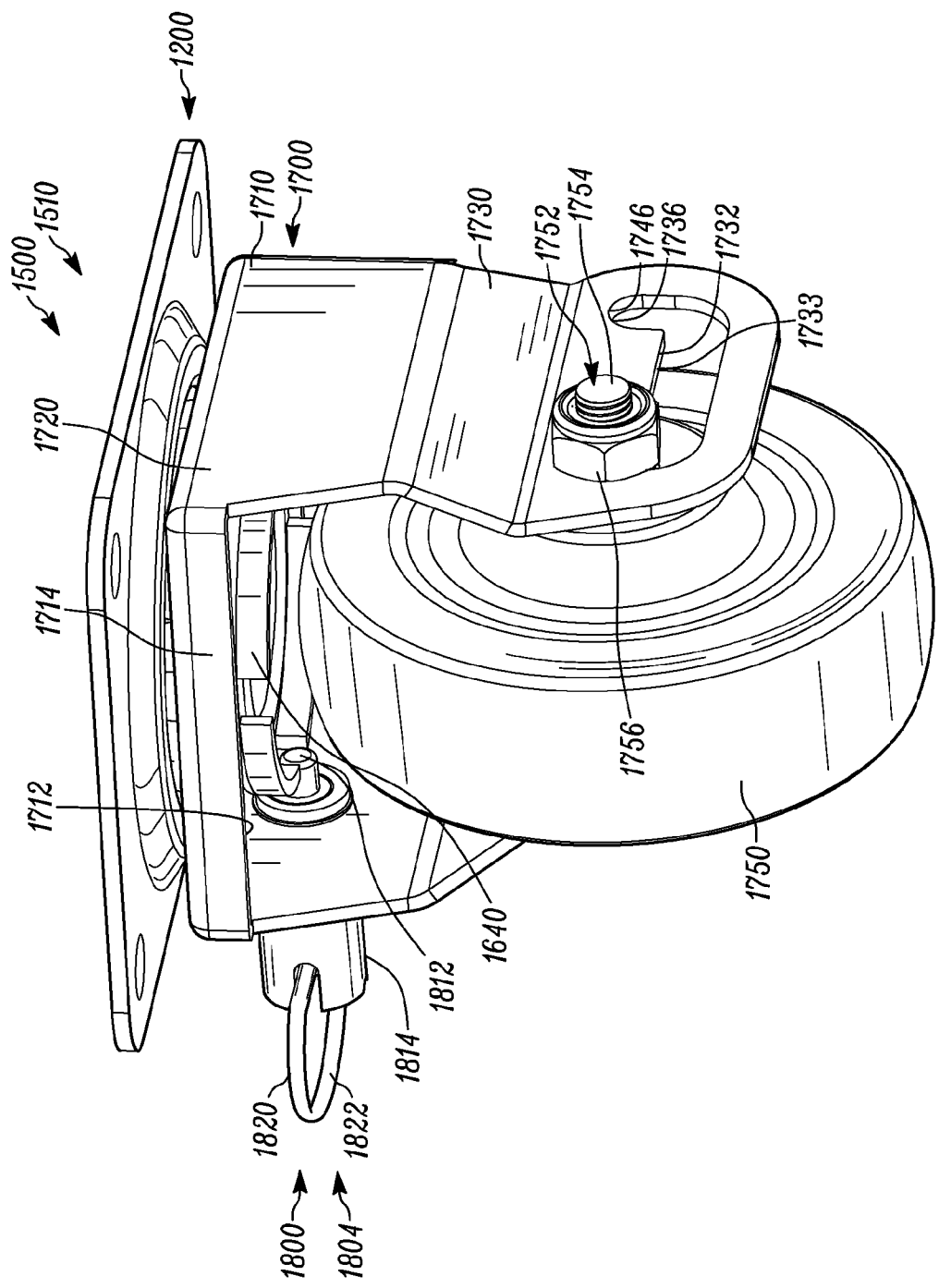
FIG. 28 is a schematic front, right side perspective view of a third exemplary embodiment of a convertible caster assembly of the present disclosure, in a non-swiveling or rigid configuration wherein a yoke assembly of the caster assembly does not swivel with respect to a support or plate assembly of the caster assembly.
Figure 29:
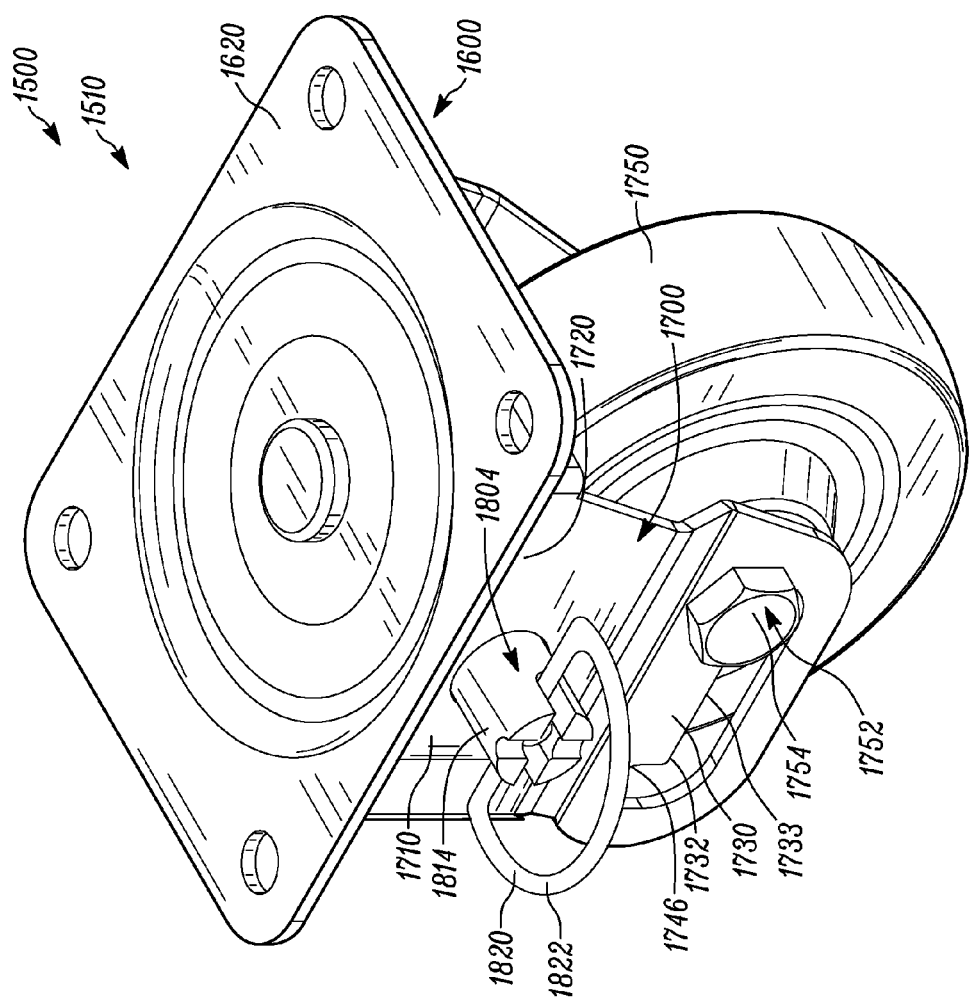
FIG. 29 is a schematic front, left side perspective view of the convertible caster assembly of FIG. 28.

The wheel axle 1752, which defines the horizontal wheel axis WA of the caster wheel 1750, is securely received in the first U-shaped openings 1744 (FIGS. 28 and 29) in a first mounting position, corresponding to the rigid configuration 1510 of the caster assembly 100 (FIGS. 28, 29 and 32). The first mounting position defined by the U-shaped openings 1744 corresponds to the rigid configuration 110 of the caster assembly 100 of the first exemplary embodiment and the rigid configuration 510 of the caster assembly 500 of the second exemplary embodiment. Alternatively, the wheel axle 1752 is securely received in the second U-shaped openings 1746 in a second mounting position, corresponding to the swiveling configuration 1520 of the caster assembly 1500 (FIGS. 30 and 31). The second mounting position defined by U-shaped openings 1746 corresponds to the swiveling configuration 120 of the caster assembly 100 of the first exemplary embodiment and the swiveling configuration 520 of the caster assembly 500 of the second exemplary embodiment.

As previously described with respect to the wheel axle 352 of the caster assembly 100, the wheel axle 1752 also includes the bolt 1754 and the mating nut 1756 to secure the wheel axle 1752 to the pair of legs 1730 of the yoke assembly 1700 and thereby affix the caster wheel 1750 in a vertically oriented position between the pair of legs 1730 of the yoke assembly 1700. The aligned U-shaped openings 1744 are used to mount the caster wheel 1750 when the caster assembly 1500 is used in the rigid configuration 1510 (FIGS. 28, 29 and 32). As can be seen in FIG. 32, when the caster wheel 1750 is mounted in the first set of aligned openings 1744, advantageously, the horizontal wheel axis of rotation WA is orthogonal to and intersects the swivel axis of rotation SA (even though in the rigid configuration 1510, the yoke assembly 1700, including the caster wheel 1750, is inhibited from swiveling or rotating about the swivel axis SA). In the rigid alignment orientation 1510 where the swivel axis SA and the wheel axis WA intersect, the caster assembly 1500 has a maximum load bearing capability.

By contrast, as can be seen in FIGS. 30 and 31, in the swiveling configuration 1520, when the caster wheel 1750 is mounted in the second set of aligned, U-shaped openings 1746, advantageously, the horizontal wheel axis of rotation WA is orthogonal to but is spaced from or offset from the swivel axis of rotation SA. The offset of the swivel axis SA from the wheel axis WA facilitates the swiveling of the yoke assembly 700, including the caster wheel 1750, about the swivel axis SA. That is, even if the dolly 50 (FIG. 1) is pushed by the user in a direction that is 90 degrees offset from a direction of the caster wheel 1750, the caster wheel 1750 still freely rotate about the swivel axis SA to rotate and conform to the direction that the user is pushing the dolly 50. That is, the wheel axis WA, which is orthogonal to the direction of movement of the wheel across a floor surface, is orthogonal to the direction that the user is pushing the dolly across the floor surface.

Thus, the first set of aligned U-shaped openings 1744 are used to position the wheel axle 1752 and the caster wheel 1750 with respect to the to the yoke 1710 such that the horizontal wheel axis of orientation WA intersects the swivel axis of rotation SA when the caster assembly 1500 is to be used in the rigid condition or configuration 1510 to provide for maximum load bearing ability, while the second set of aligned openings 1746 are used to position the wheel axle 1752 and the caster wheel 1750 with respect to the to the yoke 1710 such that the horizontal wheel axis of orientation WA is orthogonal to but offset from the swivel axis of rotation SA when the caster assembly 1500 is to be used in the swiveling condition or configuration 1520.

Advantageously, as was the case with the caster assembly 500 of the second exemplary embodiment, when it is desired to change the wheel axle 1752 from the rigid configuration 1510 to the swiveling configuration 1520 or vice versa, the user need only loosen the nut 1756 from the bolt 1754 sufficiently to allow the wheel axle 1752 to be slidingly moved along the aligned slots 1732 from the horizontally aligned, U-shaped openings 1744 to the horizontally aligned, U-shaped openings 1746 and then retighten the nut 1756 with respect to the bolt 1754 to secure the wheel axle 1752 in the openings 1746 and thereby have the caster assembly 1500 in the swiveling configuration 1520. That is, the wheel axle 1752 does not have to be removed from the aligned slots 1732 of the pair of legs 1730 of the yoke assembly 1700 to move or slide the wheel axle 1752 along the aligned slots 1732 from the first mounting position defined by U-shaped opening 1744 (corresponding to the rigid configuration 1510) to the second mounting position defined by U-shaped opening 1746 (corresponding to the swiveling configuration 1520).

Similarly, to change the wheel axle 1752 from the second mounting position defined by the U-shaped opening 1746 (the swiveling configuration 1520) to the first mounting position defined by the U-shaped opening 1744 (the rigid configuration 1510) the process is reversed. Again, the wheel axle 1752 never has to be removed from the aligned slots 1732 to move or slide the wheel axle 1752 from the second mounting position (U-shaped opening 1746) to the first mounting position (U-shaped opening 1744). The nut 1756 needs only to be sufficiently loosened from the bolt 1754 to allow the wheel axle 1752 to slide in the slots 1732 between the openings 1744, 1746, as desired, and then the nut 1756 is retighten to secure the wheel axle 1752. Advantageously, the horizontal, linear extending orientation of the central portion 1733 of the aligned slots 1732 facilitates changing between the two different mounting positions for the caster wheel 1750, as the extent of the vertically extending end portions 1734, 1736 is relatively short as compared to the horizontal extent of the linear central portion 1733. Thus, once the user has loosened the nut 1756 from the bolt 1754 sufficiently to move the wheel axle 1752 a short distance downwardly from the vertically extending end portions 1734, 1736 and into the horizontally extending central portion 1733, the wheel axle 1752 may easily be slid horizontally in a straight line along the central portion 1733 to move from one end portion to the opposite end portion. That is, the horizontal, linear central portion 1733 facilitates easy movement of the wheel axle 1752 from the rigid configuration 1510 to the swiveling configuration 1520 or vice versa, while the vertically oriented end portions 1734, 1736 provide for secure positioning of the wheel axle 1752 in the selected one of the first and second mounting positions (U-shaped openings 1744, 1746, respectively). The wheel axle 1752 slides easily along the linear central portion 1733 and, when the end of the central portion 1733 is reached, the wheel axle 1752 is pivoted or moved upwardly so as to be seated in the U-shaped opening 1744 of the first end portion 1734 or to be seated in the U-shaped opening 1746 of the second end portion 1736, for the first and second mounting positions, respectively. The nut 1756 is then re-tightened on the bolt 1754 to secure the wheel axle 1752 in the selected mounting position. The ease of sliding the wheel axle 1733 horizontally and linearly along the central portion 1733, when moving between the first and second mounting positions (U-shaped openings 1744, 1746, respectively), is especially advantageous when it is desired to changed the mounting position while the caster assembly 1500 is in use and under a load condition, that is, while a load L is being applied to the moving dolly 50. Under such a load condition, to change mounting positions, it is necessary for the user to temporarily lift the weight of the dolly 50 and load L, as applied to the caster assembly 1500 so that the wheel axle 1752 moves or drops downwardly from the vertically extending end portion that the wheel axle was seated in and moves into the linear central portion 1733. Once the wheel axle 1752 is positioned along the extent of the linear central portion 1733, the axle 1752 slides easily along the central portion 1733 to the opposite end portion even if the user allows some weight or all of the weight to be reapplied to the caster assembly 1500. Thus, the configuration of the aligned slots 1732, 1734 having a horizontal linear central portion 1733 minimizes the duration of the lifting effort required by a user seeking to change mounting positions of the caster assembly 1500 under a load condition.

Of course, as described above with respect to the caster assembly 100, for the caster assembly 1500 to be in the non-swiveling or rigid configuration 1510, in addition to the wheel axle 1752 being secured in the U-shaped opening 1744, the lock assembly 1400 must also be in the locked position 1804. Similarly, for the caster assembly 1500 to be in the swiveling configuration 1520, in addition to the wheel axle 1752 being secured in the U-shaped opening 1746, the lock assembly 1800 must also be in the unlocked position 1802.

With regard to the lock assembly 1800, in the third exemplary embodiment, the lock assembly 1400 is similar in all respects to the lock assembly 400 of the first exemplary embodiment caster assembly 100 and the lock assembly 800 of the second exemplary embodiment caster assembly 500, except for the crosspiece. In the lock assembly 400, the crosspiece 420 is in the shaped of a cylinder or shaft (as can best be seen in FIG. 2). In the lock assembly 1800 of the third exemplary embodiment, the crosspiece 1820 is configured as a pull ring 1822 (as can best be seen in FIG. 29). The pull ring 1822, which may be D-shaped (as shown in FIG. 29) or ring or annular shaped (not shown), facilitates the user grasping the crosspiece 1820 and pulling the bolt 1812 outwardly (against the spring bias of the lock assembly 1800) to change the lock assembly 1800 from a locked position 1804 (FIGS. 28 and 29) to an unlocked position 1802 (FIGS. 30 and 31). The bolt 1812 moves along the line of action LOA within the tubular sleeve 1814, as explained with respect to the first exemplary embodiment of the caster assembly 100.

The components of the convertible caster assemblies 100, 500, 1500 of the of the present invention may be fabricated of metals, such as, but not limited to steel, stainless steel, steel alloys, aluminum, or various plastic or polymer materials or various composite materials that provide for sufficient strength and durability to effectively carry desired loads applied to the caster assemblies by the weight of the dolly board 52 and any object or objects 50 being moved on the dolly board. The components of the caster assemblies 100, 500, 1500 may be fabricated by machining, stamping, forming, casting, forging, extrusion, injection molding, or other fabrication techniques know to those of skill in the art. In one exemplary embodiment, the components spring lock assemblies 400, 800, 1800 may be fabricated of stamped metal or machined metal components.

What have been described above are examples or embodiments of the present invention. It is, of course, not possible to describe every conceivable combination of components or methodologies for purposes of describing the present invention or disclosure, but one of ordinary skill in the art will recognize that many further combinations and permutations of the present invention/disclosure are possible. Accordingly, the present invention/disclosure is intended to embrace all such alterations, modifications, and variations that fall within the spirit and scope of the appended claims.

What is claimed is:

1. A caster assembly comprising:
a plate assembly configured to support an object to be moved;
a yoke assembly rotatably connected to the plate assembly including a caster wheel for rolling engagement with a surface;
the plate assembly including an upper plate and a lower plate coupled by a connector, a longitudinal extent of the connector defining a swivel axis of rotation of the yoke assembly with respect to the plate assembly, the plate assembly;
the yoke assembly including a yoke including a base and a pedestal extending axially from the base, the pedestal including a pair of spaced apart legs at a lower end of the pedestal, the base of the yoke disposed between the top and lower plates and rotatable about the connector with respect to the swivel axis of rotation, the pair of legs supporting the caster wheel for rotation about a wheel axis of rotation transverse to the swivel axis of rotation; and
a lock assembly mounted to the yoke including a bolt extending through the pedestal of the yoke and movable along a line of action between a first unlocked position and a second locked position, in the second locked position of the bolt, the bolt engaging the plate assembly to inhibit relative rotation of the yoke assembly with respect to the plate assembly about the swivel axis of rotation and in the first unlocked position of the bolt, the bolt is spaced from the plate assembly permitting relative rotation of the yoke assembly with respect to the plate assembly about the swivel axis of rotation, the line of action of the bolt being substantially parallel to the wheel axis of rotation.

2. The caster assembly of claim 1 wherein the swivel axis of rotation is perpendicular to the wheel axis of rotation.

3. The caster assembly of claim 1 wherein the line of action of the bolt of the lock assembly intersects the swivel axis of rotation.

4. The caster assembly of claim 3 wherein the lock assembly is a spring lock mounted on the pedestal, the spring lock including a sleeve having a central throughbore, the bolt sliding mounted within the sleeve and a spring interposed between the sleeve and the bolt in the sleeve throughbore, the spring biasing the bolt to the second locked position.

5. The caster assembly of claim 4 wherein the bolt moves within the throughbore of the sleeve along the radially extending line of action that intersects the swivel axis of rotation.

6. The caster assembly of claim 1 wherein the plate assembly includes a notched ring concentric about the swivel axis of rotation, the notched ring including a plurality of circumferentially spaced apart detent notches and the bolt includes an outer end and an inner end, the inner end engaging a selected one of the plurality of detent notches of the ring of the plate assembly to inhibit relative rotation of the yoke assembly with respect to the plate assembly about the swivel axis of rotation in the second locked position.

7. The caster assembly of claim 6 wherein the outer end of the bolt includes a crosspiece adjacent an outer end of the bolt that interfits into a first set of slots of the sleeve in the first unlocked position and into a second set of slots of the sleeve in the second locked position.

8. The caster assembly of claim 6 wherein the lower plate of the plate assembly includes the notched ring extending from a lower surface of the plate assembly.

9. The caster assembly of claim 1 wherein the caster wheel of the yoke assembly includes a wheel axle extending though a central opening of the wheel, the wheel axle defining the wheel axis of rotation, the pair of legs of the yoke assembly includes a first set of aligned openings to receive the wheel axle, the first set of aligned openings being positioned such that the wheel axis of rotation is perpendicular to and intersects the swivel axis of rotation.

10. The caster assembly of claim 9 wherein the pair of legs of the yoke assembly includes a second set of aligned openings to receive the wheel axle, the second set of aligned openings being positioned such that the wheel axis of rotation is perpendicular to and is spaced from the swivel axis of rotation.

11. The caster assembly of claim 9 wherein the line of action of the bolt of the lock assembly is axially aligned with the wheel axis of rotation when the wheel axle is received in the first set of aligned openings.

12. A caster assembly comprising:
a plate assembly configured to support an object to be moved;
a yoke assembly rotatably connected to the plate assembly including a caster wheel for rolling engagement with a surface;
the plate assembly including an upper plate and a lower plate coupled by a connector, a longitudinal extent of the connector defining a swivel axis of rotation of the yoke assembly with respect to the plate assembly;
the yoke assembly including a yoke including a base and a pedestal extending axially from the base, the pedestal including a pair of spaced apart legs at a lower end of the pedestal, the base of the yoke disposed between the top and lower plates and rotatable about the connector with respect to the swivel axis of rotation, the pair of legs supporting the caster wheel for rotation about a wheel axis of rotation transverse to the swivel axis of rotation, the caster wheel of the yoke assembly including a wheel axle extending through a central opening of the wheel, the wheel axle defining the wheel axis of rotation, the pair of legs of the yoke assembly include a first set of horizontally aligned openings and a second set of horizontally aligned openings, the first set of horizontally aligned openings the wheel axle being selectively movable between the first set of horizontally aligned openings and the second horizontally aligned openings, such that when the wheel axle is positioned in the first set of horizontally aligned openings, the wheel axis of rotation is perpendicular to and intersects the swivel axis of rotation and when the wheel axle is positioned in the second set of horizontally aligned openings, the wheel axis of rotation is perpendicular to and is spaced from the swivel axis of rotation; and
a lock assembly mounted to the yoke including a bolt extending through the pedestal of the yoke and movable along a line of action between a first unlocked position and a second locked position, in the second locked position of the bolt, the bolt engaging the plate assembly to inhibit relative rotation of the yoke assembly with respect to the plate assembly about the swivel axis of rotation and in the first unlocked position of the bolt, the bolt is spaced from the plate assembly permitting relative rotation of the yoke assembly with respect to the plate assembly about the swivel axis of rotation.

13. The caster assembly of claim 12 wherein the first horizontally aligned openings are at first end portions of respective horizontally aligned slots formed in the pair of legs of the yoke assembly and the second horizontally aligned openings are at second end portions of the respective horizontally aligned slots formed in the pair of legs of the yoke assembly.

14. The caster assembly of claim 13 wherein each of the horizontally aligned slots of the pair of legs of the yoke assembly include an arcuate central portion and the first and second end portions are at opposite ends of the arcuate central portion.

15. The caster assembly of claim 14 wherein the arcuate central portion of each of the horizontally aligned slots curves upwardly in a direction of the plate assembly.

16. The caster assembly of claim 14 wherein the first horizontally aligned openings at the first end portions of the horizontally aligned slots of the pair of legs of the yoke assembly are inverted, U-shaped openings and the second horizontally aligned openings at the second end portions of the horizontally aligned slots of the pair of legs of the yoke assembly are inverted, U-shaped openings.

17. The caster assembly of claim 13 wherein each of the horizontally aligned slots of the pair of legs of the yoke assembly include a linear central portion and the first and second end portions are at opposite ends of the linear central portion.

18. The caster assembly of claim 17 wherein the first and second end portions extending orthogonally from the linear central portion in a direction of the plate assembly.

19. The caster assembly of claim 12 wherein the plate assembly includes a notched ring concentric about the swivel axis of rotation, the notched ring including a plurality of circumferentially spaced apart detent notches and the bolt includes an outer end and an inner end, the inner end engaging a selected one of the plurality of detent notches of the ring of the plate assembly to inhibit relative rotation of the yoke assembly with respect to the plate assembly about the swivel axis of rotation in the second locked position, the line of action of the bolt being substantially parallel to the wheel axis of rotation.

20. A caster assembly comprising:
a plate assembly;
a yoke assembly rotatably connected to the plate assembly including a caster wheel for rolling engagement with a surface;
the plate assembly including an upper plate and a lower plate coupled by a connector, a central axis of the connector defining a swivel axis of rotation of the yoke assembly with respect to the plate assembly;
the yoke assembly including a yoke and a pair of spaced apart legs extending from the yoke, the yoke disposed between the top and bottom plates and rotatable about the connector with respect to the swivel axis of rotation, the pair of legs supporting the caster wheel for rotation about a wheel axis of rotation transverse to the swivel axis of rotation, the caster wheel of the yoke assembly including a wheel axle extending through a central opening of the wheel, the wheel axle defining the wheel axis of rotation, a first leg of the pair of legs of the yoke assembly including a first slot and the second leg of the pair of legs of the yoke assembly including a second slot, the first and second slots being horizontally aligned, each of the first and second slots include a linear central portion and a first end portion and a second end portion at opposite ends of the linear central portion, the first and second end portions extending orthogonally from the linear central portion, the first end portions of the first and second legs of the pair of legs being horizontally aligned and the second end portions of the first and second legs of the pair of legs being horizontally aligned, the wheel axle being selectively movable between the first horizontally aligned openings and the second horizontally aligned openings, such that when the wheel axle is positioned in the first horizontally aligned openings, the wheel axis of rotation is perpendicular to and intersects the swivel axis of rotation and when the wheel axle is positioned in the second horizontally aligned openings, the wheel axis of rotation is perpendicular to and is spaced from the swivel axis of rotation; and a lock assembly mounted to the yoke including a bolt movable between a first unlocked position and a second locked position, in the second locked position of the bolt, the bolt extending through the yoke and engaging the plate assembly to inhibit relative rotation of the yoke assembly with respect to the plate assembly about the swivel axis of rotation and in the first unlocked position of the bolt, the bolt is spaced from the plate assembly permitting relative rotation of the yoke assembly with respect to the plate assembly about the swivel axis of rotation.

* * * * *